US 8,648,917 B2

(12) United States Patent
Okada

(10) Patent No.: US 8,648,917 B2
(45) Date of Patent: Feb. 11, 2014

(54) IMAGING APPARATUS, IMAGE PROCESSING APPARATUS, AND IMAGE PROCESSING METHOD, AND PROGRAM

(75) Inventor: Miyuki Okada, Kanagawa (JP)

(73) Assignee: Sony Corporation, Tokyo (JP)

( * ) Notice: Subject to any disclaimer, the term of this patent is extended or adjusted under 35 U.S.C. 154(b) by 298 days.

(21) Appl. No.: 13/273,862

(22) Filed: Oct. 14, 2011

(65) Prior Publication Data

US 2012/0113278 A1    May 10, 2012

(30) Foreign Application Priority Data

Nov. 5, 2010   (JP) ................................ P2010-248838

(51) Int. Cl.
*H04N 5/228* (2006.01)
*H04N 17/02* (2006.01)
*G06K 9/40* (2006.01)

(52) U.S. Cl.
USPC .................... 348/208.4; 348/187; 382/275

(58) Field of Classification Search
USPC .............. 348/208.4, 187–188, 335, 360–361, 348/47–48; 382/275
See application file for complete search history.

(56) References Cited

U.S. PATENT DOCUMENTS

2008/0291447 A1* 11/2008 Vakrat et al. ................. 356/364
2010/0295956 A1* 11/2010 Goto .......................... 348/208.6
2011/0141228 A1* 6/2011 Shimada ....................... 348/36

FOREIGN PATENT DOCUMENTS

JP     2008-524673      7/2008
WO    WO 2006/062325 A1   6/2006

* cited by examiner

*Primary Examiner* — Lin Ye
*Assistant Examiner* — Mekonnen Dagnew
(74) *Attorney, Agent, or Firm* — Oblon, Spivak, McClelland, Maier & Neustadt, L.L.P.

(57) ABSTRACT

Disclosed is an imaging apparatus including a plurality of imaging units; a correction unit that executes a correction process for images captured by a plurality of the imaging units; and a control unit that computes a correction parameter applied to a correction process in the correction unit, wherein the correction unit executes distortion aberration correction and hand-vibration correction for each of the captured images and an image characteristic matching correction process for matching characteristics between a plurality of images captured by a plurality of the imaging units.

15 Claims, 23 Drawing Sheets

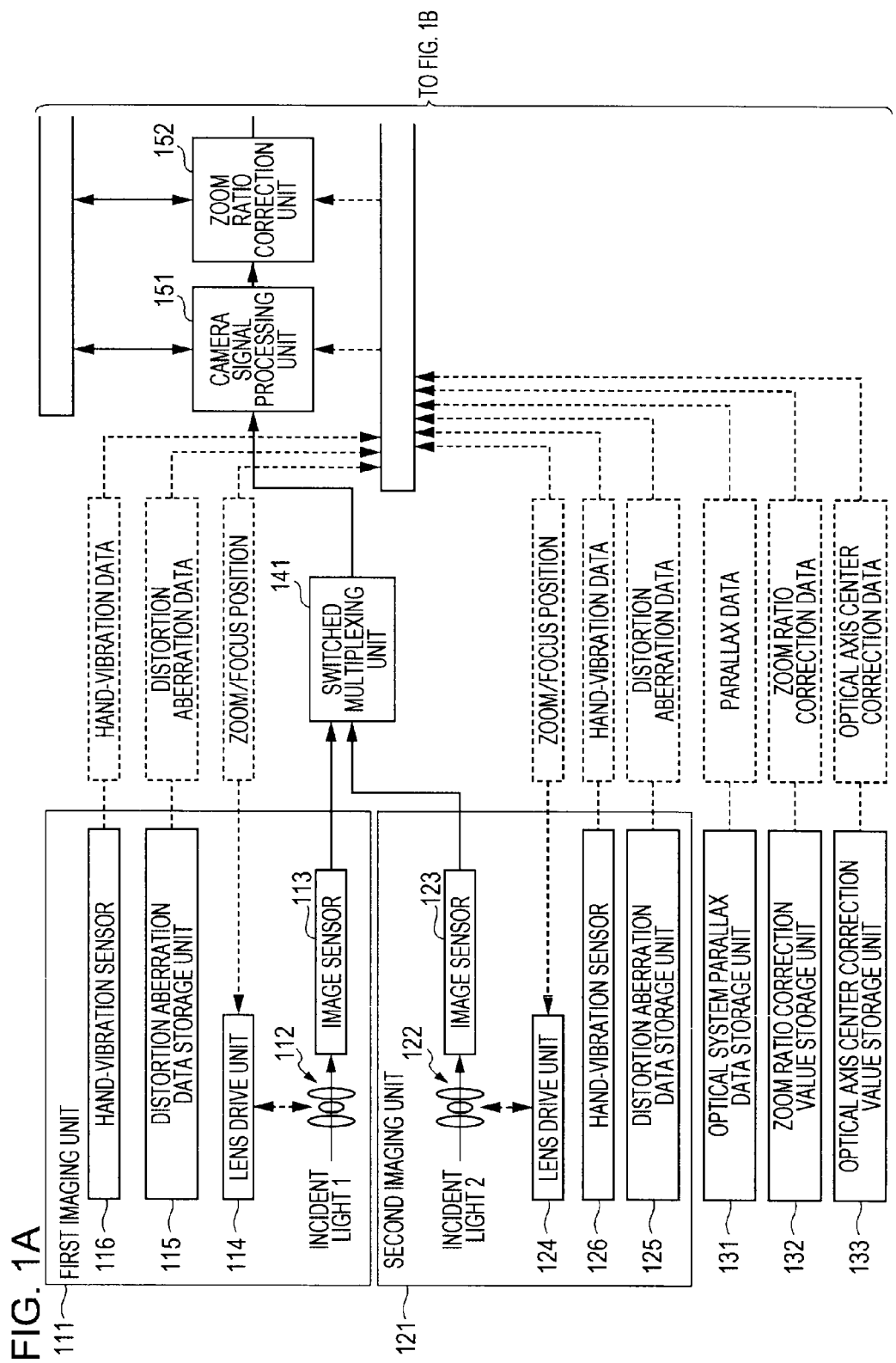

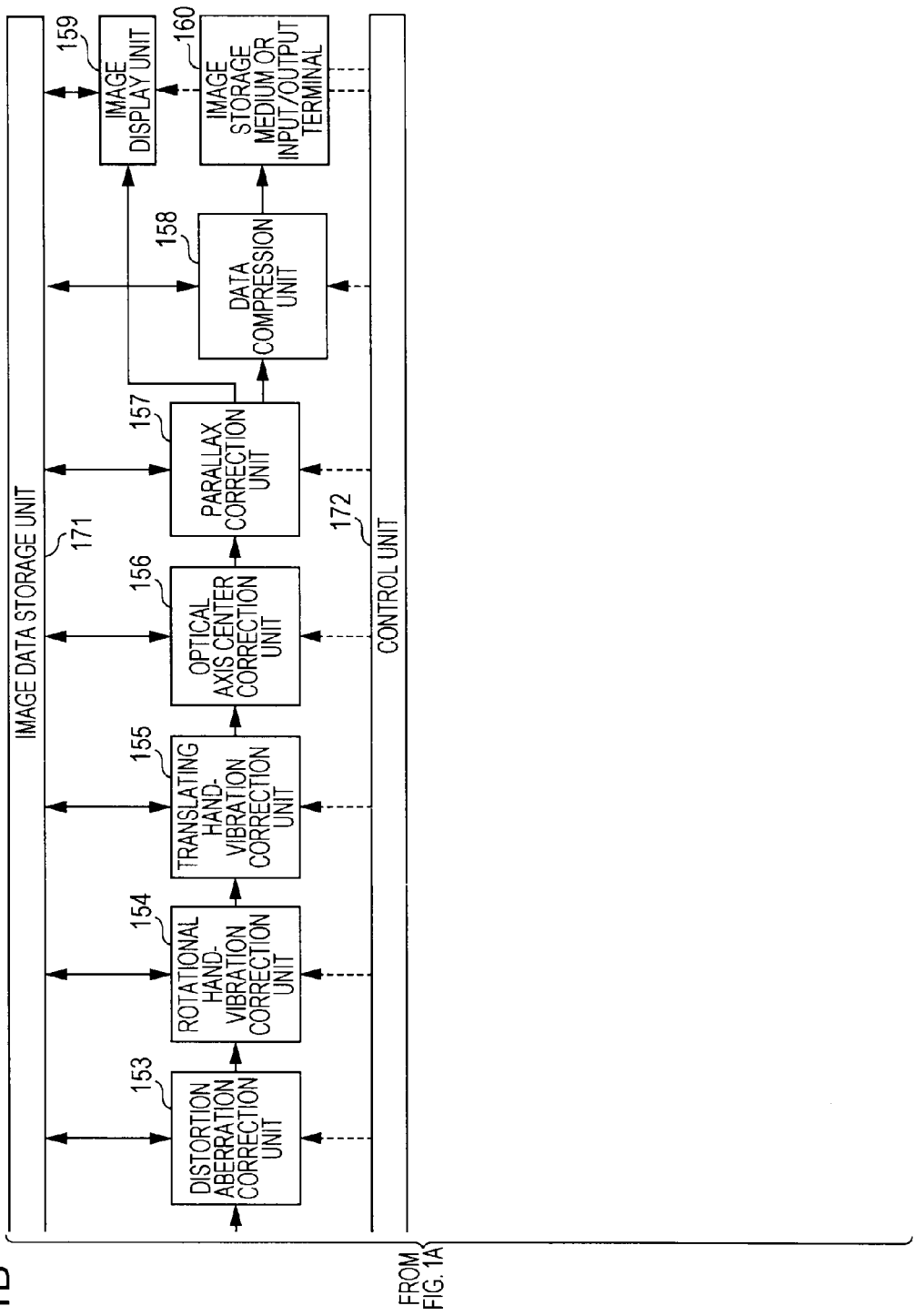

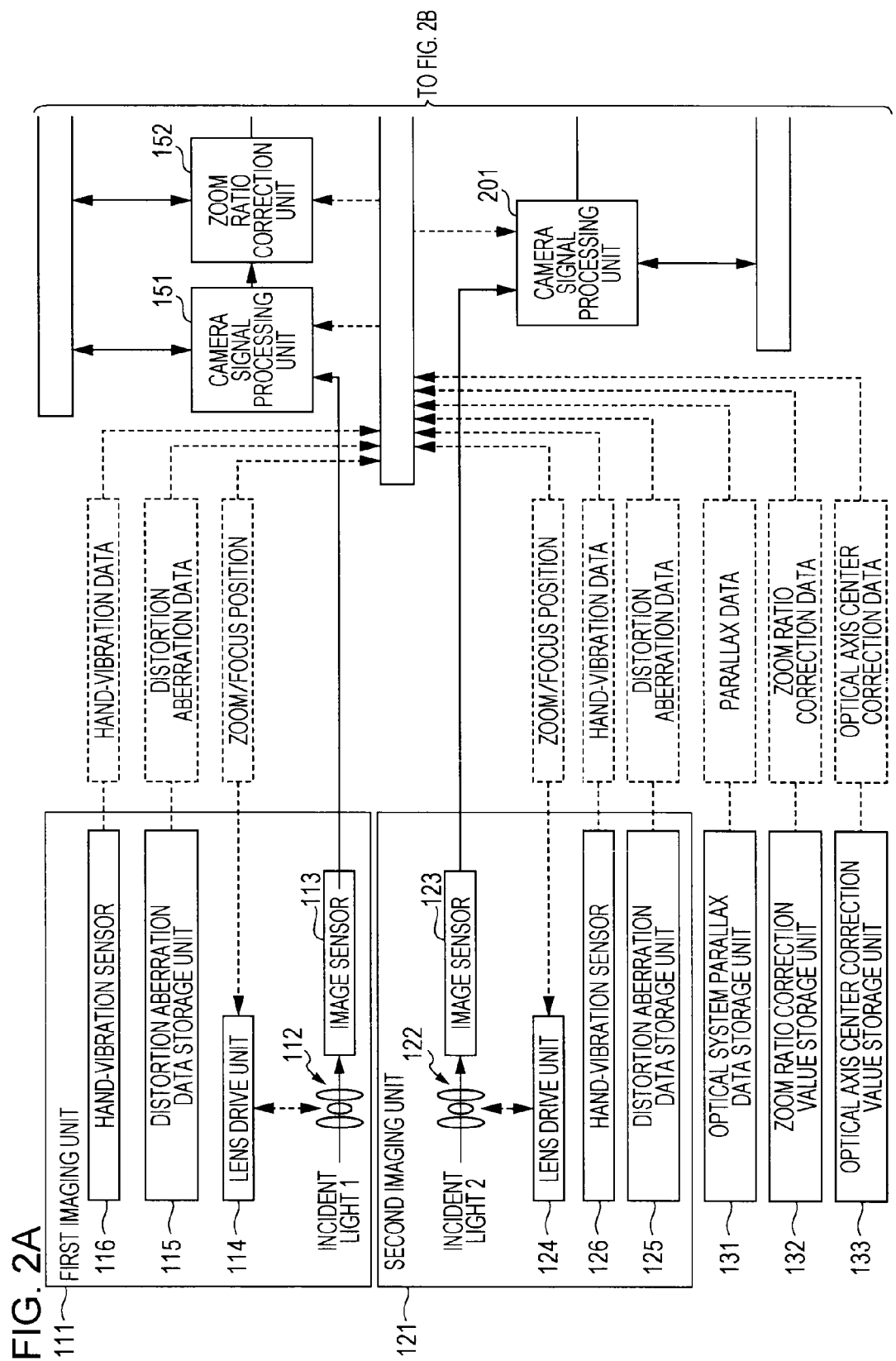

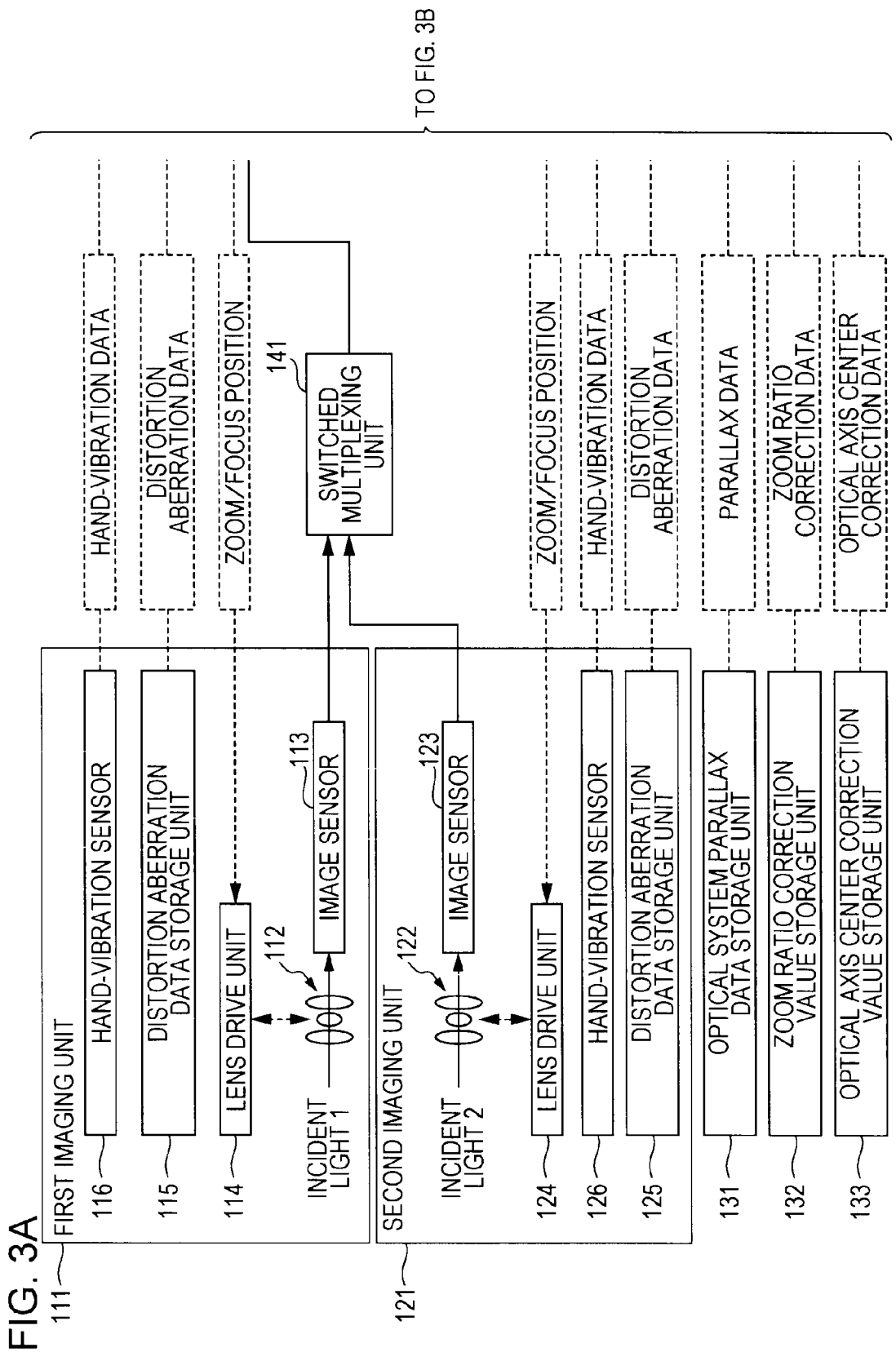

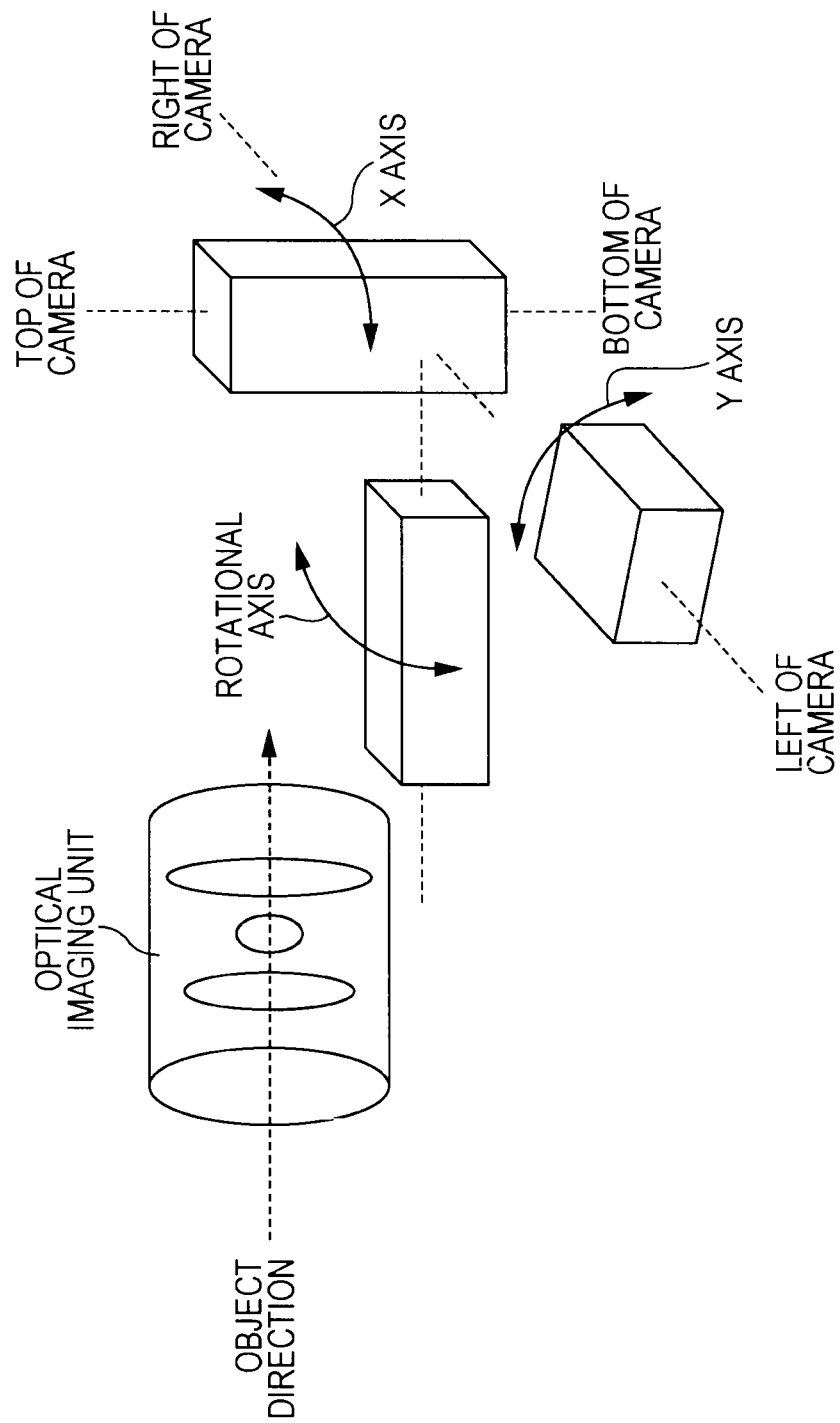

ROTATIONAL CENTER IS LOCATED INSIDE IMAGE

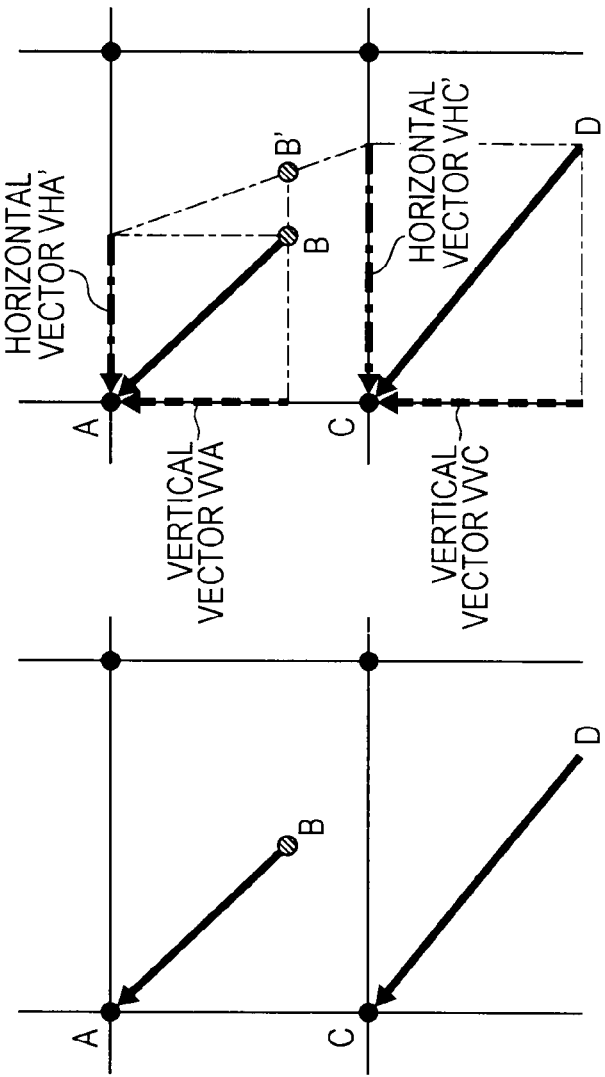

IMAGING APPARATUS, IMAGE PROCESSING APPARATUS, AND IMAGE PROCESSING METHOD, AND PROGRAM

BACKGROUND

The present disclosure relates to an imaging apparatus, an image processing apparatus, an image processing method, and a program. More particularly, the disclosure relates to an imaging apparatus, an image processing apparatus, an image processing method, and a program capable of correcting images captured by the imaging apparatus.

In recent years, imaging apparatuses such as a still camera, a video camera, a single lens reflex camera, a camera built-in to a mobile device, a camera built-in to a PC are being miniaturized, and their costs and weights are being reduced. However, these miniaturized and light-weight cameras have many design limitations in the optical systems such as lenses. As a result, image degradation caused by, for example, lens aberration and the like may easily occur.

Lens distortion aberration (distortion) is a phenomenon that can easily occur as the zoom ratio of the camera increases. There are specific examples of lens distortion aberration, for example, as follows: (a) barrel distortion by which the captured image is circularly outwardly skewed like a barrel, (b) pincushion distortion by which four corners of the image are extracted and stretched like a pincushion, and (c) a mixture of both distortion types, for example, such as lens distortion aberration or mustache distortion.

Distortion aberration can be prevented by improving precision of the lens design to some extent, but it is difficult to remove it completely. Particularly, in the miniaturized, light-weight, and low-cost camera as described above, it is realistically difficult to use lenses fabricated with high precision. In order to address such a problem, recently, cameras having a function of correcting distortion of the captured image by performing geometrical transformation through image processing are being developed.

In addition, another problem accompanying miniaturization and increasing light-weightness of cameras is that stability of the captured image is deteriorated by user's hand-vibration or vibration (in a vehicle and the like) of the imaging condition. Techniques for suppressing such a vibration component representatively include a technique of suppressing vibration by guiding light into a direction capable of optically canceling out the vibration in a lens portion or an image sensor portion (optical correction), and a technique of reading the image data obtained after the imaging by canceling out the data that corresponds to the vibration (electronic correction). In both types of correction techniques, the vibration component is divided into translation vectors, for example, using two axes in the horizontal and vertical directions (X and Y directions, respectively), and each correction amount is computed. However, in practice, hand-vibration further has a rotational vector component in addition to the translation vector in many cases. Therefore, it is difficult to remove this rotational hand-vibration using the translating correction in the X and Y directions.

Meanwhile, a human being can stereoscopically view an object because both eyes are separated at a certain interval, by which the object is viewed from different directions, and spatially offset images are focused on each retina. That is, a stereoscopic feeling is recognized using parallax between both eyes.

A so-called stereo camera for capturing stereoscopic images using the imaging apparatus, that is, a camera having two optical imaging channels is also based on this principle. Two different channels of images are captured as a source of the stereoscopic image.

As such, the stereo camera generates two-channel images, that is, the left-eye image and the right-eye image and stores them in a memory. The left-eye and right-eye images are alternately displayed, for example, on a 3D display. A viewer can view a stereoscopic image by wearing shutter type glasses and viewing each image with only a left eye or only a right eye. Various techniques other than the shutter type glasses technique can be employed to display 3D images.

Although a sense of depth can be perceived depending on the parallax of the captured image through the 3D display image, the stereo camera has some requirements in capturing an image to suppress viewer fatigue and realize comfortable vision. Specifically, it is necessary to adjust setting of the parallax or accurately optimize the installation position or direction of two-channel optical imaging systems for the left-eye image and the right-eye image.

Since each channel of the two-channel optical imaging system for the left-eye image and the right-eye image of the stereo camera uses an individual lens, separate lens distortion aberration is individually generated. Therefore, in order to remove distortion aberration, it is necessary to individually correct each lens.

An exemplary technique for correcting two types of images captured by the stereo camera of the related art is disclosed in, for example, Japanese Unexamined Patent Application Publication (Translation of PCT Application) No. 2008-524673.

As described above, the image correction process for the image captured by a camera includes lens distortion aberration correction, translating hand-vibration correction, and rotational hand-vibration correction. Further, in the case of a stereo camera, correction is further necessary depending on many other purposes, such as parallax correction for the two-channel optical imaging system.

SUMMARY

It is desirable to provide an imaging apparatus, an image processing apparatus, an image processing method, and a program capable of reliably executing many other types of correction for the images captured by a camera, such as lens distortion aberration correction, translating hand-vibration correction, rotational hand-vibration correction, and parallax correction for a two-channel optical imaging system for an image.

According to a first embodiment of the present disclosure, there is provided an imaging apparatus including: a plurality of imaging units; a correction unit that executes a correction process for images captured by a plurality of the imaging units; and a control unit that computes a correction parameter applied to a correction process in the correction unit, wherein the correction unit executes distortion aberration correction and hand-vibration correction for each of the captured images and an image characteristic matching correction process for matching characteristics between a plurality of images captured by a plurality of the imaging units.

In the imaging apparatus according to the embodiment of the disclosure, the correction unit may execute a zoom ratio correction process for matching zoom ratios of a plurality of images captured by a plurality of the imaging units as the image characteristic matching correction process.

In the imaging apparatus according to the embodiment of the disclosure, the correction unit may execute an optical axis center correction process for matching optical axis centers of a plurality of images captured by a plurality of the imaging units as the image characteristic matching correction process.

In the imaging apparatus according to the embodiment of the disclosure, the correction unit may further execute a parallax correction process for adjusting parallax of a plurality of images captured by a plurality of the imaging units.

In the imaging apparatus according to the embodiment of the disclosure, the control unit may compute a correction parameter applied to the correction process in the correction unit and provide the correction parameter to the correction unit.

In the imaging apparatus according to the embodiment of the disclosure, the correction parameter may be a correction vector applied to coordinate transformation of an image in a correction unit.

In the imaging apparatus according to the embodiment of the disclosure, the correction unit may include: a distortion aberration correction unit that executes distortion aberration correction for each of the captured images; a rotational hand-vibration correction unit that executes rotational hand-vibration correction for each of the captured images; a translating hand-vibration correction unit that executes translating hand-vibration correction for each of the captured images; a zoom ratio correction unit that matches zoom ratios as characteristics of a plurality of images captured by a plurality of the imaging units; an optical axis center correction unit that matches optical axis centers as characteristics of a plurality of images captured by a plurality of the imaging units; and a parallax correction unit that executes a parallax correction process for adjusting parallax of a plurality of images captured by a plurality of the imaging units.

In the imaging apparatus according to the embodiment of the disclosure, the control unit may compute a combined correction vector obtained by combining correction vectors applied to a plurality of different correction processes executed by the correction unit and provide the combined correction vector to the correction unit, and the correction unit may collectively execute a plurality of different correction processes through an image transformation process by applying the combined correction vector.

In the imaging apparatus according to the embodiment of the disclosure, the control unit may compute a combined correction vector obtained by combining correction vectors applied to each of a distortion aberration correction process, a rotational hand-vibration correction process, a translating hand-vibration correction process, a zoom ratio correction process, an optical axis center correction process, and a parallax correction process, and provide the combined correction vector to the correction unit, and the correction unit may collectively execute the distortion aberration correction process, the rotational hand-vibration correction process, the translating hand-vibration correction process, the zoom ratio correction process, the optical axis center correction process, and the parallax correction process through an image transformation process by applying the combined correction vector.

In the imaging apparatus according to an embodiment of the disclosure, the imaging apparatus may have a distortion aberration data storage unit that stores distortion aberration data corresponding to the imaging unit applied to distortion aberration correction, and the control unit may create a distortion aberration correction parameter based on the data obtained from the distortion aberration data storage unit.

In the imaging apparatus according to the embodiment of the disclosure, the imaging apparatus may have an optical axis center correction value storage unit that stores optical axis center correction data applied to optical axis center correction for matching optical axis centers as characteristics of a plurality of images captured by a plurality of imaging units, and the control unit may generate an optical axis center correction parameter based on the data obtained from the optical axis center correction value storage unit.

In the imaging apparatus according to the embodiment of the disclosure, the imaging apparatus may have a zoom ratio correction value storage unit that stores zoom ratio correction data applied to zoom ratio correction for matching zoom ratios as characteristics of a plurality of images captured by a plurality of imaging units, and the control unit may generate a zoom ratio correction parameter based on data obtained from the zoom ratio correction value storage unit.

In the imaging apparatus according to the embodiment of the disclosure, the imaging apparatus may have a parallax data storage unit that stores parallax data applied to parallax correction for adjusting parallax of a plurality of images captured by a plurality of imaging units, and the control unit may generate a parallax correction parameter based on the data obtained from the parallax data storage unit.

According to a second embodiment of the present disclosure, there is provided an image processing apparatus including: a correction unit that executes a correction process for images captured by a plurality of imaging units; and a control unit that computes a correction parameter applied to a correction process in the correction unit, wherein the correction unit executes distortion aberration correction and hand-vibration correction for each captured image and executes an image characteristic matching correction process for matching characteristics of a plurality of images captured by a plurality of the imaging units.

According to a third embodiment of the present disclosure, there is provided an image processing method executed in an image processing apparatus, the method including: computing a correction parameter applied to a correction process in a correction unit; and executing the correction process for images captured by a plurality of imaging units by applying the correction parameter, wherein the executing of the correction process includes executing distortion aberration correction and hand-vibration correction for each of the captured images, and executing an image characteristic matching correction process for matching characteristics of a plurality of images captured by a plurality of the imaging units.

According to a fourth embodiment of the present disclosure, there is provided a program for executing a image processing in an image processing apparatus, including: computing a correction parameter applied to a correction process in a correction unit; and executing the correction process for images captured by a plurality of imaging units by applying the correction parameter, wherein the executing of the correction process includes executing distortion aberration correction and hand-vibration correction for each of the captured images, and executing an image characteristic matching correction process for matching characteristics of a plurality of images captured by a plurality of the imaging units.

The program of the present disclosure is a program provided, for example, using a storage medium for an information processing apparatus, a computer, or a system capable of executing various programs or codes. A process according to the program is realized by executing such a program in a program execution unit in an information processing apparatus, a computer, or a system.

Further or other objectives, advantages, or features of the present disclosure will be apparent by reading the following detailed description based on embodiments of the disclosure and the accompanying drawings which will be described below. In addition, a system herein refers to a logical aggregate configuration of a plurality of devices, and it is not necessary to house each device in the same casing.

According to the embodiments of the disclosure, it is possible to provide a configuration capable of effectively and reliably realizing a plurality of different image correction processes for captured images. Specifically, it is possible to provide a configuration capable of reliably executing zoom ratio correction, distortion aberration correction, rotational hand-vibration correction, translating hand-vibration correction, optical axis center correction, and parallax correction. In addition, it is possible to provide a configuration capable of realizing effective processing by collectively executing such correction processes. Particularly, for zoom ratio correction, optical axis center correction, and parallax correction necessary in a stereo camera that captures two types of images at two different viewpoints, it is possible to provide a high quality 3D image by correcting at least one of the captured images from two imaging units. Furthermore, by computing a combined correction vector by combining the correction vectors applied to each correction process and applying the combined correction vector to the correction, it is possible to realize effective and reliable correction.

BRIEF DESCRIPTION OF THE DRAWINGS

FIGS. 1A and 1B are diagrams illustrating a configuration example of an imaging apparatus according to a first embodiment of the disclosure.

FIGS. 2A and 2B are diagrams illustrating a configuration example of an imaging apparatus according to a second embodiment of the disclosure.

FIGS. 3A and 3B are diagrams illustrating a configuration example of an imaging apparatus according to a third embodiment of the disclosure.

FIG. 5 is a diagram illustrating a configuration and an installation example of a hand-vibration sensor.

FIGS. 20A to 20C are diagrams illustrating an addition processing example of the correction vector.

DETAILED DESCRIPTION OF EMBODIMENTS

Figure 2B:
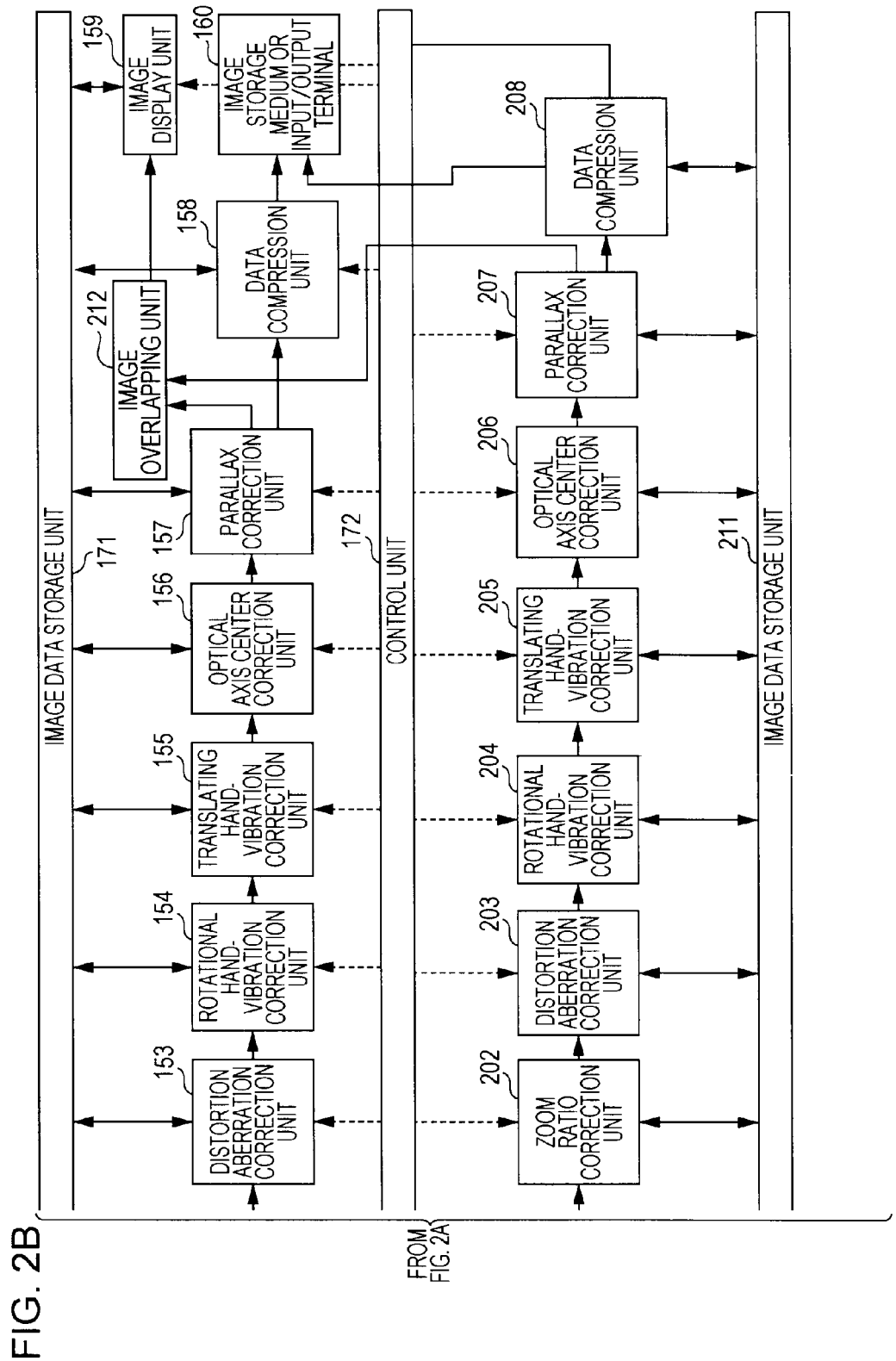

Hereinafter, an imaging apparatus, an image processing apparatus, an image processing method, and a program of the disclosure will be described in detail with reference to the accompanying drawings. Description will be made according to the following sequence.

1. Configuration and Processing in Imaging Apparatus
1-1. Configuration of First Embodiment
1-2. Configuration of Second Embodiment
1-3. Configuration of Third Embodiment
2. Details of Processing in Apparatus of the Disclosure
3. Sequence of Image Correction Process in Imaging Apparatus
3-1. Correction Sequence of Individual Correction Processes
3-2. Sequence of Correction for Collectively Executing Plurality of Correction Processes
4. Correction Vectors as Correction Parameters Corresponding to Correction Purposes
4-1. (a) Correction Vector as Zoom Ratio Correction Parameter Applied to Zoom Ratio Correction Process
4-2. (b) Correction Vectors as Distortion Aberration Correction Parameter Applied to Distortion Aberration Correction Process
4-3. (c) Correction Vectors as Rotational Hand-vibration Correction Parameter Applied to Rotational Hand-vibration Correction Process
4-4. (d) Correction Vector as Translating Hand-vibration Correction Parameter Applied to Translating Hand-vibration Correction Process
4-5. (e) Correction Vectors as Optical Axis Center Correction Parameter Applied to Optical Axis Center Correction Process
4-6. (f) Correction Vectors as Parallax Correction Parameter Applied to Parallax Correction
5. Detailed Example of Process of Combining Correction Vectors 1. Configuration and Processing in Imaging Apparatus Hereinafter, a configuration and processing example of an imaging apparatus as an example of an image processing apparatus according to the disclosure will be described with reference to FIGS. 1A and 1B. The imaging apparatus according to the disclosure performs image correction for removing image quality degradation generated by various reasons such as lens distortion aberration generated in an optical imaging system, or hand-vibration in a device caused by an operator or an operational condition, for example, including translating hand-vibration or rotational hand-vibration.

Particularly, in an apparatus having a plurality of imaging systems such as a stereo camera, distortion aberration correction, translating hand-vibration correction, rotational hand-vibration correction, parallax correction for adjusting positional relationship of each output image, and the like are optimally performed by each imaging system. For example, by outputting an image created through such correction processes on a 3D image display apparatus, it is possible for viewers to comfortably view a high quality image without any feeling of fatigue or sense of discomfort.

The image correction processes such as distortion aberration correction, translating hand-vibration correction, rotational hand-vibration correction, and parallax correction executed as a correction process for an image can be realized by geometrical transformation or coordinate transformation of the image. Therefore, a plurality of types of correction can be simultaneously processed by adding correction components to be executed, for example, depending on each purpose and performing image correction, and it is possible to realize effective correction.

A plurality of embodiments of the imaging apparatus according to the disclosure will now be described. The embodiments include an embodiment in which each correction process such as distortion aberration correction, translating hand-vibration correction, rotational hand-vibration correction, and parallax correction is individually executed, and an embodiment in which those correction processes are collectively executed.

1-1. Configuration of First Embodiment

FIGS. 1A and 1B are configuration diagrams illustrating an embodiment of the imaging apparatus of the present disclosure. The imaging apparatus shown in FIGS. 1A and 1B is a stereo camera having a two-channel imaging unit for capturing left-eye and right-eye images, that is, the first imaging unit 111, and a second imaging unit 121 of FIG. 1A.

In addition to a lens group 112 (a unit of one or more lenses) for collecting incident light and forming an image, the first imaging unit 111 includes an image sensor 113 such as CCD or CMOS for imaging output light of the lens group 112, a lens drive unit 114 for driving a predetermined lens in the lens group 112 to read a position thereof, a distortion aberration data storage unit 115 that stores distortion aberration data of the lens group 112, and a hand-vibration sensor 116 installed in the vicinity of the optical imaging unit to detect vibration thereof.

The second imaging unit 121 also has a configuration similar to that of the first imaging unit 111, and includes a lens group 122, an image sensor 123, a lens drive unit 124, a distortion aberration data storage unit 125, and a hand-vibration sensor 126.

The distortion aberration data stored in the distortion aberration data storage units 115 and 125 represent distortion aberration types corresponding to the lens groups 112 and 122 of each imaging unit. The distortion aberration data has unique values of the lens groups and changes by a zoom position and the like. Therefore, each of the distortion aberration data storage unit 115 and the distortion aberration data storage unit 125 stores discrete distortion aberration data corresponding to several representative zoom positions extending from a wideview end to a teleview end allowed as zoom ranges of the lens groups 112 and 122 of each imaging unit. In addition to a plurality of zoom positions, distortion aberration data corresponding to the focus positions may be stored.

In each imaging unit 111 and 121, position information on the zoom lens or the focus lens may be transmitted from the lens drive unit 114 or 124 to the control unit 172. In addition, the distortion aberration data depending on the lens position may be read from the distortion aberration data storage unit 115 or 125 and provided to the control unit 172. The control unit 172 computes a distortion aberration correction value for correcting the distortion aberration in the captured image based on such input values and outputs them as parameters for the distortion aberration correction executed by the distortion aberration correction unit 153.

The hand-vibration sensors 116 and 126 of each imaging unit 111 and 121 are installed in the vicinity of the imaging unit and output an electric signal depending on a hand-vibration type including a vibration amount or a vibration direction as hand-vibration data to the control unit 172. The control unit 172 adjusts the hand-vibration data input from the hand-vibration sensor 116 and 126 based on the position of the zoom lens or the focus lens obtained from the lens drive unit 114 and 124, computes a rotational hand-vibration correction value or a translating hand-vibration correction value, and outputs these values as correction parameters to the rotational hand-vibration correction unit 154 for executing rotational hand-vibration correction or the translating hand-vibration correction unit 155 for executing translating hand-vibration correction.

In the configuration of the imaging apparatus of FIGS. 1A and 1B, two imaging units, that is, the first imaging unit 111 and the second imaging unit 121 are used as a right camera for capturing a right-eye image and a left camera for capturing a left-eye image, respectively, used for 3D image display. In this setup, the imaging units 111 and 121 read the output signals from the image sensors 113 and 123, respectively, and the output signals are output to a set of camera signal processing units 151 while they are switched at regular time intervals using the switched multiplexing unit 141 so as to be transformed to a predetermined format of image signals.

For the image signal input to the camera signal processing unit 151, correction processes are sequentially executed using the zoom ratio correction unit 152 to the parallax correction unit 157 in the drawing. A part of parameters for the correction processes executed by the zoom ratio correction unit 152 to the parallax correction unit 157 are computed by the control unit 172. The control unit 172 receives the following data from each imaging unit 111 and 121: the zoom/focus position information from the lens drive units 114 and 124; the distortion aberration data from the distortion aberration data storage units 115 and 125; the hand-vibration data from the hand-vibration sensors 116 and 126; the parallax data from the optical system parallax data storage unit 131; the zoom ratio correction data from the zoom ratio correction value storage unit 132; and the optical axis center correction data from the optical axis center correction value storage unit 133; and computes parameters used to execute correction in the zoom ratio correction unit 152 to the parallax correction unit 157. The computed parameters are provided to the zoom ratio correction unit 152 to the parallax correction unit 157 for executing correction.

The zoom ratio correction unit 152 to the parallax correction unit 157 execute each image correction process by applying the correction parameters received from the control unit 172. The corrected images obtained through execution in each of the zoom ratio correction unit 152 to the parallax correction unit 157 are stored in the image data storage unit 171 temporarily, and each correction unit extracts the correction result of the correction unit of the previous stage from image data storage unit 171 and executes correction.

The zoom ratio correction unit 152 to the parallax correction unit 157 execute correction processes by alternately switching the image captured by the first imaging unit 111 and the image captured by the second imaging unit 121 at regular time intervals. That is, the switched multiplexing unit 141 outputs the image captured by the first imaging unit 111 and the image captured by the second imaging unit 121 by alternately switching them at regular time intervals. The control unit 172 computes the parameters applied for correction of each image, for example, correction vectors in response to a switching timing and provides the parameters to the zoom ratio correction unit 152 to the parallax correction unit 157.

The zoom ratio correction unit 152 executes correction such as zoom in/out of the image depending on the zoom ratio used at the time of imaging. Specifically, the correction process includes a process for matching the zoom ratios of a plurality of images including a pair of the image captured by the first imaging unit 111 and the image captured by the second imaging unit 121, that is, an image characteristic matching process for matching characteristics of a plurality of images.

The control unit 172 obtains zoom ratio correction data from the zoom ratio correction value storage unit 132 based on the zoom ratio information input from the lens drive units 114 and 124 and provides them as correction parameters to the zoom ratio correction unit 152. The zoom ratio correction unit 152 executes correction by applying the input parameters.

As shown in FIGS. 1A and 1B, in a case where there are a plurality of imaging units, a slight difference may occur in the position of the zoom lens or the optical zoom ratio between each imaging unit even when the image is captured set at the zoom position where a user is located, such that a plurality of resulting images may differ slightly. In a case where a 3D image (stereoscopic image) is created using the image captured by the first imaging unit 111 and the image captured by the second imaging unit 121 as shown in FIGS. 1A and 1B, it is important to remarkably reduce such a difference of the zoom ratio.

The zoom ratio correction value storage unit 132 maintains the correction values for remarkably reducing such a difference of the zoom ratio. The control unit 172 reads the correction value depending on the condition of the zoom lens or the focus lens from the zoom ratio correction value storage unit 132, computes a zoom ratio correction parameter based on this read value, and provides it to the zoom ratio correction unit 152. The zoom ratio correction unit 152 executes a zoom in/out process for the image depending on the zoom ratio correction parameter to create a zoom ratio correction image depending on the zoom ratio set at the time of imaging. In addition, the zoom ratio correction unit 152 processes a single image or each of the images captured by a plurality of imaging units and adjusts the zoom ratios between one another (matching).

The distortion aberration correction unit 153 executes correction of the lens distortion aberration generated in the captured image. The parameters applied to the correction process are computed by the control unit 172. The control unit 172 reads necessary distortion aberration data from the distortion aberration data storage units 115 and 125 depending on the zoom lens position information obtained from the lens drive units 114 and 124 and computes the distortion aberration correction parameter. The computed parameter is provided to the distortion aberration correction unit 153, and the distortion aberration correction unit 153 executes correction by applying the input parameter. Through the distortion aberration correction, the coordinates of each pixel are transformed to the coordinates capable of forming an image without distortion aberration so that it is possible to obtain an image signal with fidelity based on the shape of an object.

The rotational hand-vibration correction unit 154 corrects rotational hand-vibration for the image signal for which the distortion aberration has been corrected. Further, the translating hand-vibration correction unit 155 corrects hand-vibration of an up/down/left/right translating movement to stabilize the image. The control unit 172 computes the parameter applied to the hand-vibration correction and provides the parameter to the rotational hand-vibration correction unit 154 and the translating hand-vibration correction unit 155.

The control unit 172 reads the rotational hand-vibration data or the translating hand-vibration data from the hand-vibration sensors 116 and 126 and inputs the zoom position/focus position obtained from the lens drive units 114 and 124. The control unit 172 computes the correction parameters applied to the rotational hand-vibration correction and the translating hand-vibration correction based on such an input value. In addition, the zoom position/focus position obtained from the lens drive units 114 and 124 or the rotational hand-vibration data/translating hand-vibration data obtained from the hand-vibration sensors 116 and 126 are switchingly read in conjunction with the switched multiplexing in the first imaging unit 111 and the second imaging unit 121.

Through the hand-vibration correction executed by the rotational hand-vibration correction unit 154 and the translating hand-vibration correction unit 155, various types of vibration mixedly generating out of the hand-vibration are divided into the rotational hand-vibration and the up/down/left/right translating hand-vibration, and each type of vibration is reduced or removed. In the output image, a static article can be viewed as it is without vibration, so that it is possible to provide a user with a high quality image with stability.

The optical axis center correction unit 156 executes correction of the optical axis center for a pair of output images obtained from two imaging units 111 and 121. A pair of output images obtained from two imaging units 111 and 121 can be viewed by a user as a stereoscopic image (3D image) by executing a 3D image display process such as alternate switching display using the image display unit 159. However, a slight difference is present in the image depending on the installation position of the optical imaging systems of the first and second imaging units 111 and 121, so that the optical axis center may differ. The optical axis center correction unit 156 executes correction of the optical axis center for a pair of output images obtained from a pair of imaging units 111 and 121 such that an optimal positional relationship can be provided. Specifically, the optical axis center correction unit 156 executes a process of matching a plurality of images including a pair of images captured by the first imaging unit 111 the image captured by the second imaging unit 121, that is, an image characteristic matching correction process.

The control unit 172 obtains the optical axis center correction data from the optical axis center correction storage unit 133 and provides it to the optical axis center correction unit 156. The optical axis center correction unit 156 executes correction based on the correction value.

In the configuration including a plurality of imaging units as shown in FIGS. 1A and 1B, the center of the optical axis passing through the lens unit is slightly deviated on the image sensor depending on installation (assembling) accuracy of the image sensor and the lens unit so as not to match the obtained image center. In addition, the optical center coordinates of a plurality of obtained images may not match each other. Since such an optical axis center serves as a reference in the distortion aberration of the optical zoom or lens, it is necessary to execute a process of matching them, that is, an optical axis center correction process as a process of matching the optical center coordinates between the image captured by the imaging unit 111 and the image captured by the imaging unit 121.

The optical axis center correction value storage unit 133 stores the correction value as the optical axis center correction data for the correction. Depending on the zoom lens/focus lens condition, the control unit 172 reads the correction value from the optical axis center correction value storage unit 133, and computes the correction parameter provided to the optical axis center correction unit 156, for example, a correction vector for matching the centers of the images captured by a pair of imaging units. The optical axis center correction unit 156 performs the process for a single image or for each of the images captured by a plurality of imaging units and performs the correction process for matching the coordinates of the optical axis centers with each other.

The parallax correction unit 158 performs parallax correction for a pair of output images obtained from two imaging units 111 and 121. The parallax correction unit 158 performs parallax correction based on the parallax correction parameter computed by the control unit 172. It is possible to know what a distance of a main object from the imaging apparatus is when using the focus position or the zoom position obtained from the lens drive units 114 and 124. The control unit 172 computes this distance, reads the parallax data from the optical system parallax data storage unit 131 depending on a separation interval of two imaging units 111 and 121, computes the parallax correction parameter, and provides it to the parallax correction unit 158. The parallax correction unit 158 executes parallax correction for correction a parallax distortion using this parameter.

Through the aforementioned correction processes, a user can comfortably view a stereoscopic image, a feeling of fatigue or a sense of discomfort is suppressed to a minimum. In addition, as a parallax distortion correction process executed by the parallax correction unit 158, for example, a process disclosed in Japanese Unexamined Patent Application Publication No. 2008-524673 may be applicable.

A 3D image (stereoscopic image) obtained as a result is displayed on the image display unit 159. In addition, if necessary, a compression process is performed by the data compression unit 158 to reduce a size, and the resulting 3D image is output to the image storage medium/input-output terminal 160 so that a storing process for a storage unit or an external output process is undertaken.

As shown in FIGS. 1A and 1B, each correction processing unit transmits/receives the control data or the setting parameters to/from the control unit 172. In addition, each correction unit obtains the correction target image from the image data storage unit 171 and stores the correction result. Further, each correction processing unit may directly transmit/receive the image data or may transmit/receive the image data via the image data storage unit 171.

1-2. Configuration of Second Embodiment

The imaging apparatus of FIGS. 2A and 2B illustrates the imaging apparatus according to a second embodiment of the disclosure. The imaging apparatus of FIGS. 2A and 2B includes each of two imaging units individually has the correction processing unit followed by the camera signal processing unit.

That is, for the output signal from the first imaging unit 111, the correction processes are executed by the camera signal processing unit 151, the zoom ratio correction unit 152, the distortion aberration correction unit 153, the rotational hand-vibration correction unit 154, the translating hand-vibration correction unit 155, the optical axis center correction unit 156, and the parallax correction unit 157.

Meanwhile, for the output signal from the second imaging unit 121, the correction processes are executed by the camera signal processing unit 201, the zoom ratio correction unit 202, the distortion aberration correction unit 203, the rotational hand-vibration correction unit 204, the translating hand-vibration correction unit 205, the optical axis center correction unit 206, and the parallax correction unit 207. As such, according to the present embodiment, double processing channels are provided for each imaging unit.

For example, the distortion aberration data, rotational hand-vibration data, translating hand-vibration data, and the like are obtained in each imaging unit as individual data, and they are input to the control unit 172 so that the correction parameters corresponding each imaging unit are computed and provided to each correction unit of each processing channel. As such, it is possible to obtain an increase in speed by providing independent signal processing channels corresponding to each imaging unit and operating them in parallel. In addition, in the configuration shown in FIGS. 2A and 2B, the image data storage unit for storing the image in the course of correction and as also shown in the diagram the image data storage unit 171 corresponding to the output of the first imaging unit 111 and the image data storage unit 211 corresponding to the output of the second imaging unit 121 have a configuration so as to be individually set.

1-3. Configuration of Third Embodiment

Figure 3B:
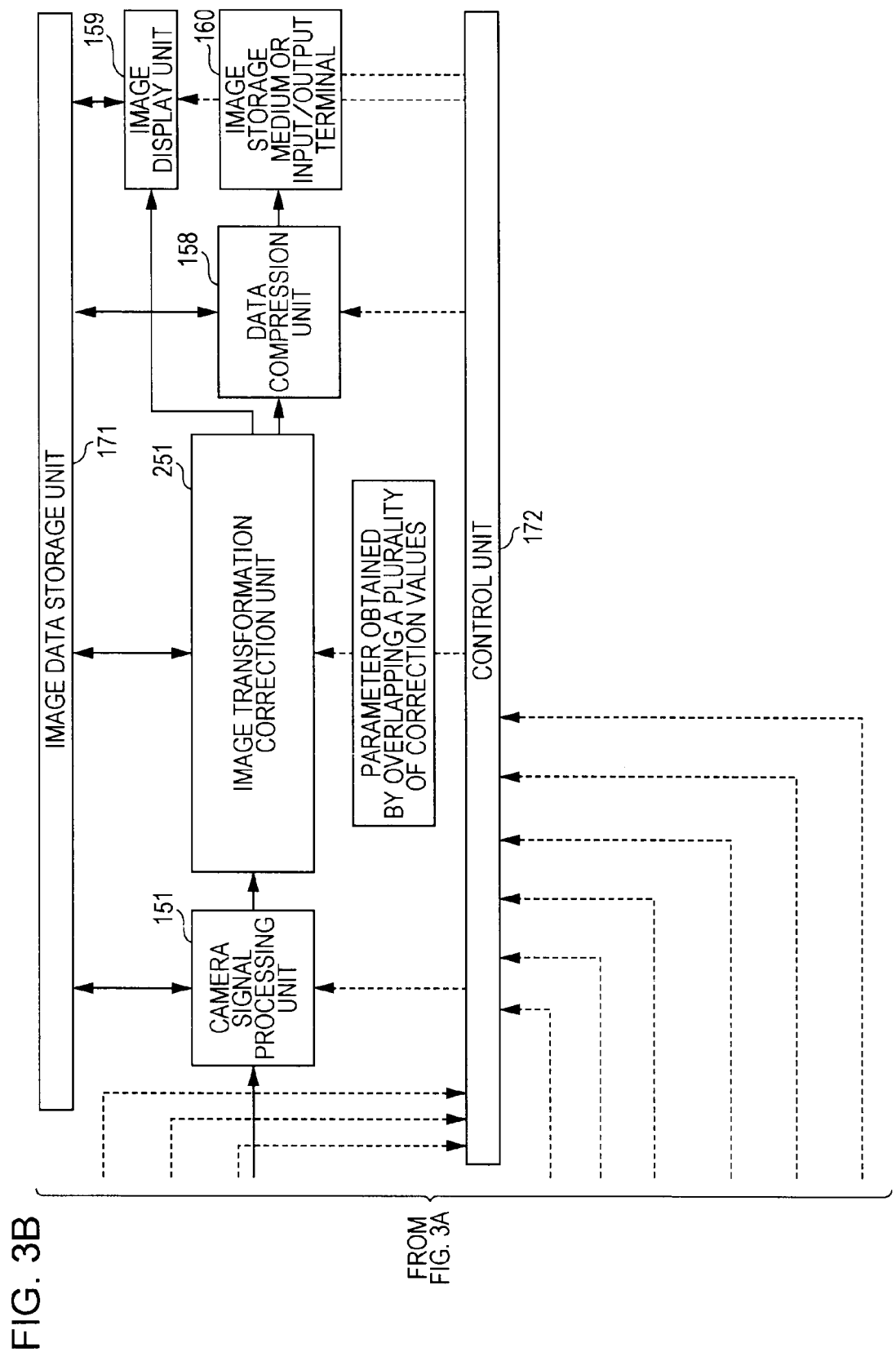

FIGS. 3A and 3B illustrate the imaging apparatus according to the third embodiment of the disclosure. In the imaging apparatus of FIGS. 3A and 3B, the zoom ratio correction unit 152, the distortion aberration correction unit 153, the rotational hand-vibration correction unit 154, the translating hand-vibration correction unit 155, the optical axis center correction unit 156, and the parallax correction unit 157 of FIG. 1B are substituted into a single image transformation correction unit 251.

The correction processes executed in the zoom ratio correction unit 152, the distortion aberration correction unit 153, the rotational hand-vibration correction unit 154, the translating hand-vibration correction unit 155, the optical axis center correction unit 156, and the parallax correction unit 157 of FIG. 1B are collectively processed in the image transformation correction unit 251. Since each correction executed by each correction unit of FIGS. 1A and 1B are a sort of coordinate transformation process, they can be simultaneously processed by combining two or more, or all of them. Through such simultaneous processing, devices can be simplified, and low cost and low power consumption can be obtained. In addition, by integrating a plurality of such correction units, communication of image data to/from the image data storage unit can be remarkably simplified, so that they can be processed at increased speed with low power consumption.

In the embodiment of FIGS. 3A and 3B, similar to the configuration of FIGS. 1A and 1B, the hand-vibration sensors 116 and 126, and the distortion aberration data storage units 115 and 125 are individually provided in each of the first and second imaging units 111 and 121. Similar to the configuration of FIGS. 1A and 1B, the destination is switched in synchronization with the switched multiplexing of the image signal. On the contrary, since two imaging units are present in the same imaging apparatus, the value of the hand-vibration and the characteristics of the lens distortion aberration can be regarded as the same, and the hand-vibration sensor and the distortion aberration data storage unit can be simplified as a common configuration unit in each imaging unit without individually setting them. That is, only a single hand-vibration sensor and only a single distortion aberration data storage unit can be set, and information can be shared by a plurality of imaging units.

2. Details of Processing in Apparatus of the Disclosure

Figure 4A:
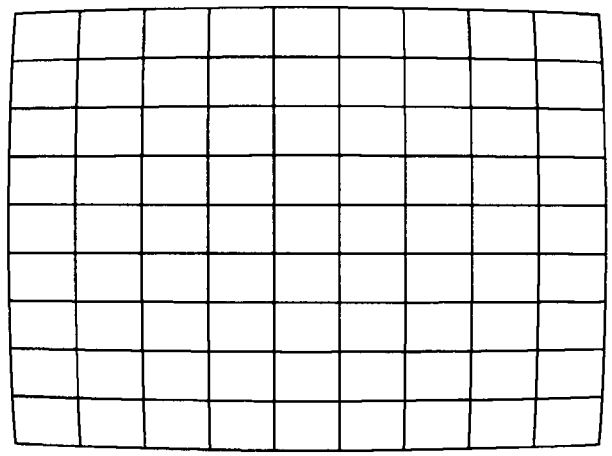
FIGS. 4A and 4B are diagrams illustrating distortion aberration.
Figure 4B:
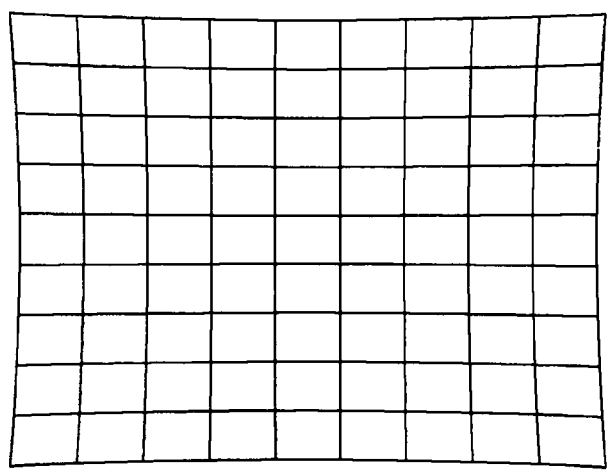

Next, each process executed in the image processing apparatus of the disclosure will be described in detail. First, an example of the distortion aberration will be described with reference to FIGS. 4A and 4B. FIGS. 4A and 4B illustrate images having lens distortion aberration. FIG. 4A illustrates barrel distortion by which an image is outwardly skewed in a circular shape, and FIG. 4B illustrates pincushion distortion by which four corners of the image is outwardly extracted and stretched to generate a skew. Also, there is a mixture of both types (for example, mustache distortion). The distortion aberration correction unit or the image transformation correction unit of the image processing apparatus of the disclosure described with reference to FIGS. 1 to 3 is capable of easily performing correction for any one of (a) barrel distortion, (b) pincushion distortion, or a mixture of both types, depending on the values of the distortion aberration data (parameters) stored in advance in the distortion aberration data storage unit.

FIG. 5 is a diagram illustrating an installation example of the hand-vibration sensor. As a detection device for hand-vibration, there are a mechanical detection device such as a gyro-sensor, and a detection device that detects a motion vector through image processing in a plurality of images. According to the disclosure, any device may be employed as the hand-vibration sensor.

Examples of the mechanical detection device such as a gyro-sensor include a gyro-sensor that detects a rotation speed in a pillar shape as shown in FIG. 5. In order to detect the values of rotational hand-vibration and translating hand-vibration, it is necessary to provide three hand-vibration sensors that are perpendicular to one another for three axes corresponding to translating-hand vibration (image movement in the X direction) by which an image view angle of the imaging unit is vibrated horizontally, translating hand-vibration (image movement in the Y direction) by which the imaging unit is vibrated vertically, and rotational vibration with respect to the axis parallel to the optical axis of the imaging unit (rotation of the image). In addition, the hand-vibration sensors is installed very closely to the imaging unit so as to obtain accurate values. In the event of two or more imaging units, each hand-vibration sensor may be installed in an optimal position for each imaging unit, or a single hand-vibration sensor may be installed in a suitable position for sharing between both imaging units. Either of configurations may be used.

Figure 6:
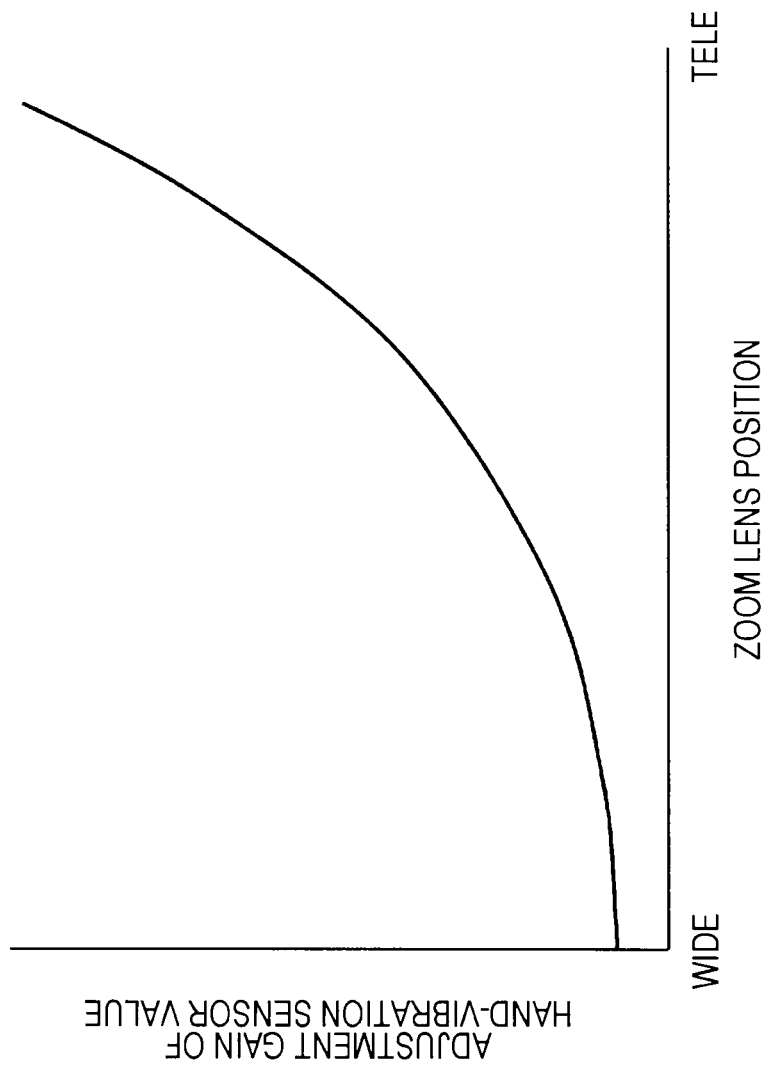
FIG. 6 is a diagram illustrating a relationship between the zoom position and the gain value of the hand-vibration sensor.

FIG. 6 illustrates an adjustment gain of the hand-vibration sensor value depending on the position of the zoom lens. If the hand-vibration detection device is a mechanical detection device such as a gyro-sensor, and the hand-vibration correction unit is an electronic type (in which the image signal is shifted and cut out), the up/down/left/right correction amounts for the image increases as the zoom lens position approaches the teleview even with the same hand-vibration sensor value. Therefore, a look-up table for the adjustment gain thereof is necessary. Reference of this look-up table or adjustment of the hand-vibration value is performed in the control unit. In addition, the hand-vibration correction process is disclosed in, for example, Japanese Patent Registration No. 3279342.

As another example of the hand-vibration detection device, there is a motion vector detection device. In this technique, a plurality of images captured and obtained at a constant time interval are stored, and a motion vector is extracted through image processing from a plurality of these images. Through this process, it is possible to obtain rotation motion vector as well as translating motion vector. In addition, such a processing configuration is disclosed in, for example, Japanese Patent Registration Nos. 4212109 (assigned by Panasonic Corp.) and 4487811 (assigned by SONY Corp.).

Figure 7A:
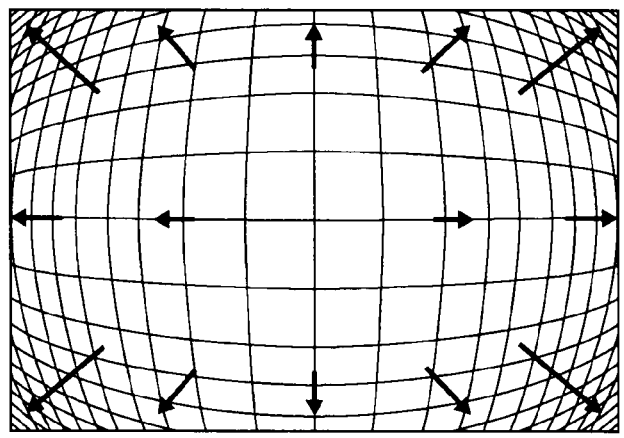
FIGS. 7A and 7B are diagrams illustrating a distortion aberration correction vector and a translating hand-vibration correction vector.

FIG. 7A illustrates an exemplary setting of the correction vector for the image suffering from barrel distortion aberration. The vectors (arrows) illustrated in the image are correction vectors. If barrel distortion aberration is generated when an image of a grid-shaped object perpendicularly extending across the length and the breadth is captured, the straight lines extending across the length and the breadth in the captured image are outwardly inflated and skewed like a barrel. Vectors for correcting this phenomenon are set such that the image is magnified toward the lens periphery depending on a distance from the lens center (in the vicinity of the image center) as shown in FIG. 7A. Typically, the farther from the lens center, the larger the magnitude of the correction vector is toward the lens circumference.

Figure 7B:
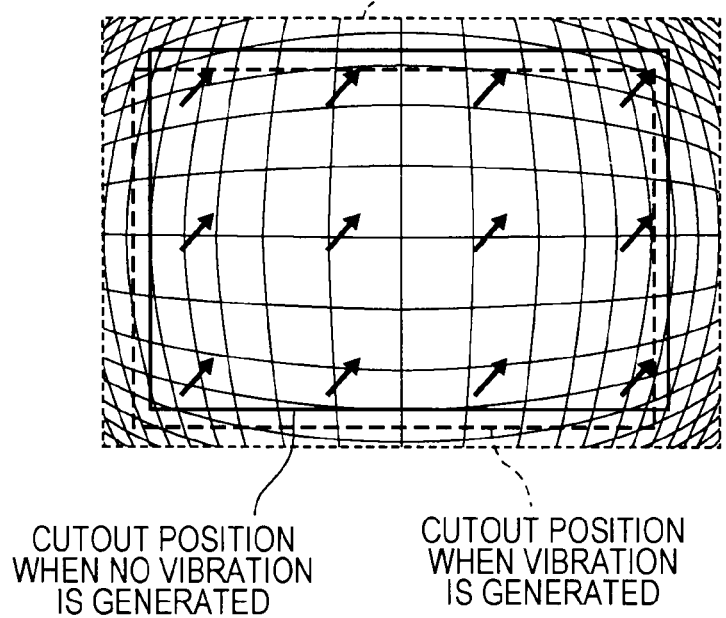

FIG. 7B is a diagram illustrating an exemplary setting of the correction vectors for the image suffering from the translating hand-vibration. The vectors (arrows) in the image are correction vectors. The example of FIG. 7B illustrates an exemplary setting of the correction vectors for the image, in which the translating hand-vibration is generated due to a movement from the upper right to the lower left while the image is captured.

Typically, an image sensor uses a necessary image near the center, cut out from a slightly larger image. However, in a case where the imaging apparatus is vibrated vertically or horizontally due to hand-vibration, the vibration can be cancelled out by shifting the entire image obtained by the image sensor as much as the vibration amount and cutting out a necessary image. That is, in such a process, the entire image is uniformly corrected using vectors having the same magnitude and the same direction.

The translating hand-vibration may be corrected by obtaining values from the X-axis vibration sensor and the Y-axis vibration sensor that have been described with reference to FIG. 5, computing correction values are computed, shifting the position as much as those values. In some cases, since the cutout position may be shifted during the image sensor reading, the entire image is read from the image sensor, a certain process is performed, and then, a write address used to store the image data in the image data storage unit or a read address may be shifted.

FIGS. 8A to 8E are diagrams illustrating an exemplary setting of the correction vectors for the image suffering from rotational hand-vibration. The vectors (arrows) shown in each image are correction vectors. All of the captured images in FIGS. 8A to 8E suffer from counterclockwise rotational hand-vibration in the imaging apparatus side. As a result, although the image is captured with an inclination clockwise, the setting of the correction vectors is changed depending on where the center of the rotation correction is provided in the image. The center of the rotation correction may not necessarily be the center of actual rotational vibration. Since the center of the rotation correction is virtually set when the correction vectors are set, it may be provided basically in any place in the image. The center of the rotation correction is preferably not significantly separated from the image in order to maintain accuracy of the setting value of the correction vector. However, it may be set arbitrarily in either the inner side or the outer side of the image.

Figure 8B:
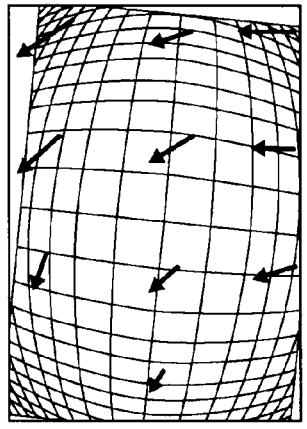
FIGS. 8A to 8E are diagrams illustrating a rotational hand-vibration correction vector.
Figure 8A:
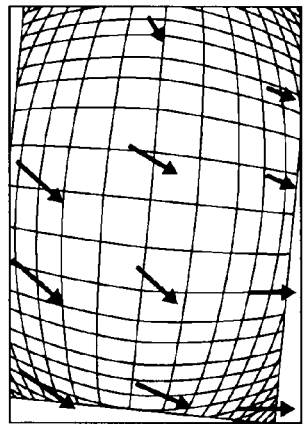

In FIG. 8A, the center of the rotation correction is provided in the vicinity of the lower right corner of the image (either the inner or outer side of the image). Therefore, the correction vector is set to a counterclockwise rotation with respect to that point. In addition, the magnitude of the correction vector increases as a distance from the center of the rotation correction increases.

Figure 8E:
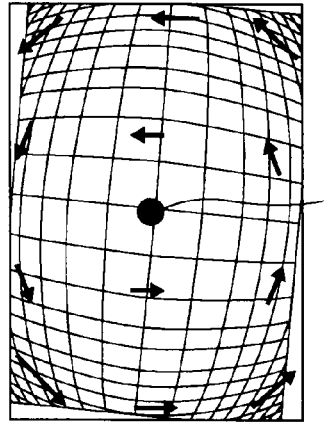
Figure 8D:
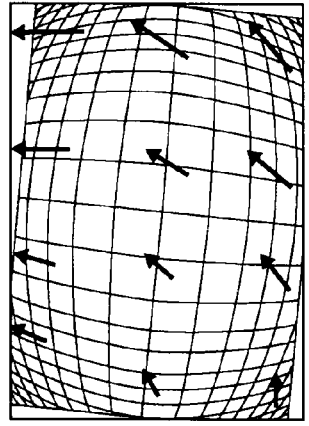
Figure 8C:
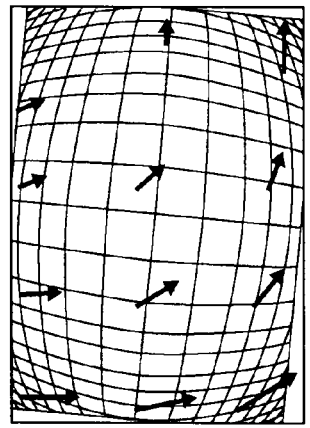

The centers of the rotational correction are located in the lower left of the image in FIG. 8B, in the upper right of the image in FIG. 8C, in the upper left of the image in FIG. 8D, and in the approximate center of the image in FIG. 8E. As shown in FIG. 8A to 8E, the setting of the magnitude and the direction of the correction vector is changed depending to the setting of the center position of the rotation correction even in the input image having the same rotational hand-vibration.

Figure 9A:
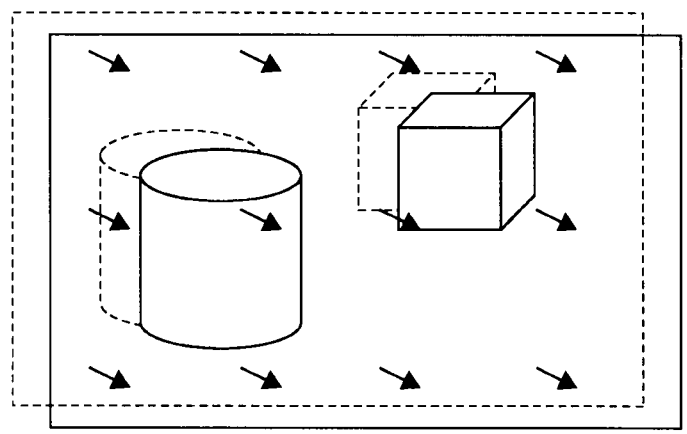
FIGS. 9A and 9B are diagram illustrating a parallax correction vector.
Figure 9B:
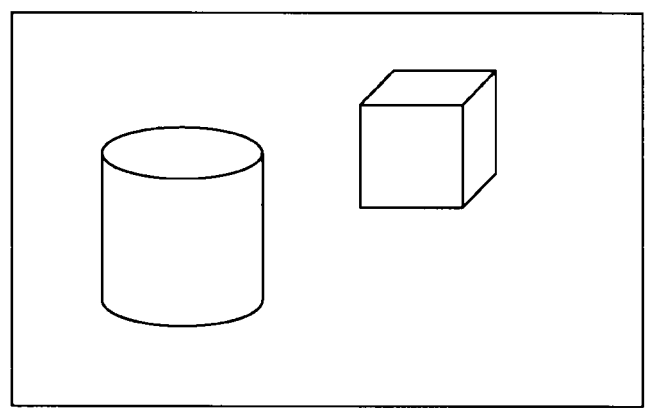

FIGS. 9A and 9B are diagrams illustrating an example of parallax correction. FIG. 9A illustrates an image captured by the first imaging unit and, FIG. 9B illustrates an image captured by the second imaging unit.

The vectors (arrows) shown in the image captured by the first imaging unit in FIG. 9A are parallax correction vectors. In the processing sequence of the embodiment of FIGS. 1A and 1B described above, the input image of the parallax correction unit 157 is an image subject to each correction process in the zoom ratio correction unit 152 to the optical axis center correction unit 156. At this point in time, it is necessary to perform only parallax correction for the image captured by the first imaging unit 111 and the image captured by the second imaging unit 121. The image captured by the first imaging unit 111 and the image captured by the second imaging unit 121 are slightly different from each other.

The parallax correction unit 157 obtains correction data from the optical system parallax data storage unit 131 and performs parallax correction for at least one of the image captured by the first imaging unit 111 and the image captured by the second imaging unit 121 such that a stereoscopic image including both images has desired parallax. Typically, the parallax correction can be realized by translating the image and performing a magnification/reduction process as necessary. Depending on a distance from the imaging apparatus to each object, any one of a case of adjusting the parallax correction data and a case of using fixed data is applied.

For example, as apparent from the description with respect to FIGS. 7 to 9, all of the distortion aberration correction, the translating hand-vibration correction, the rotational hand-vibration correction, and the parallax correction can be processed using a coordinate transformation process. Through the translating hand-vibration correction, correction vectors can be uniformly generated across the entire window by virtue of horizontal and vertical translating movements, and an image can also be shifted. In both the distortion aberration correction and the rotational hand-vibration correction, correction vectors are set depending on the position in the image. Therefore, it is possible to simultaneously perform the correction processes using a single correction unit similar to the image transformation correction unit 251 of FIGS. 3A and 3B as described above by setting a combination of both correction vectors.

Figure 10:
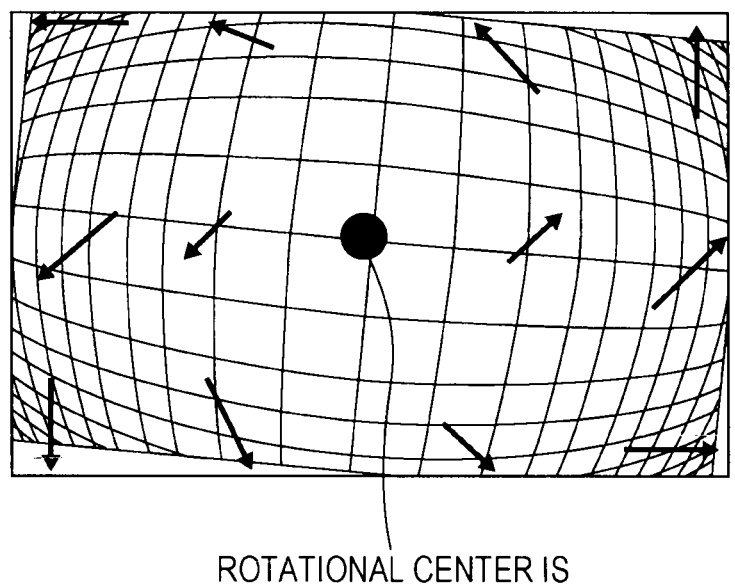
FIG. 10 is a diagram illustrating an exemplary setting of addition vectors for distortion aberration correction and rotational hand-vibration correction.

FIG. 10 illustrates an exemplary setting of vectors obtained by combining both of the correction vectors applied to the barrel distortion aberration correction described with reference to FIG. 7A and the correction vectors applied to the rotational correction process in a case where the rotation center exists in the image as shown in FIG. 8E. The vectors (arrows) indicated in the image are correction vectors executed by combining the barrel distortion aberration correction and the rotational correction.

In each coordinate in the window, if a plurality of vectors are added as the coordinate transformation, the correction values can be combined. A plurality of types of correction processes can be simultaneously executed by setting vectors for various correction processes to a single combination of the correction vector and executing a coordinate transformation process by applying a combined correction vector using a single correction unit similar to the image transformation correction unit 251 of FIG. 3B.

Although FIG. 10 illustrates a combined processing example for the distortion aberration correction and the rotational hand-vibration correction, other vectors including the correction vectors of the translating hand-vibration correction, parallax correction, and the like can be combined. Through the coordinate transformation process using these combined correction vectors, a plurality of types of correction processes can be simultaneously executed.

Figure 11:
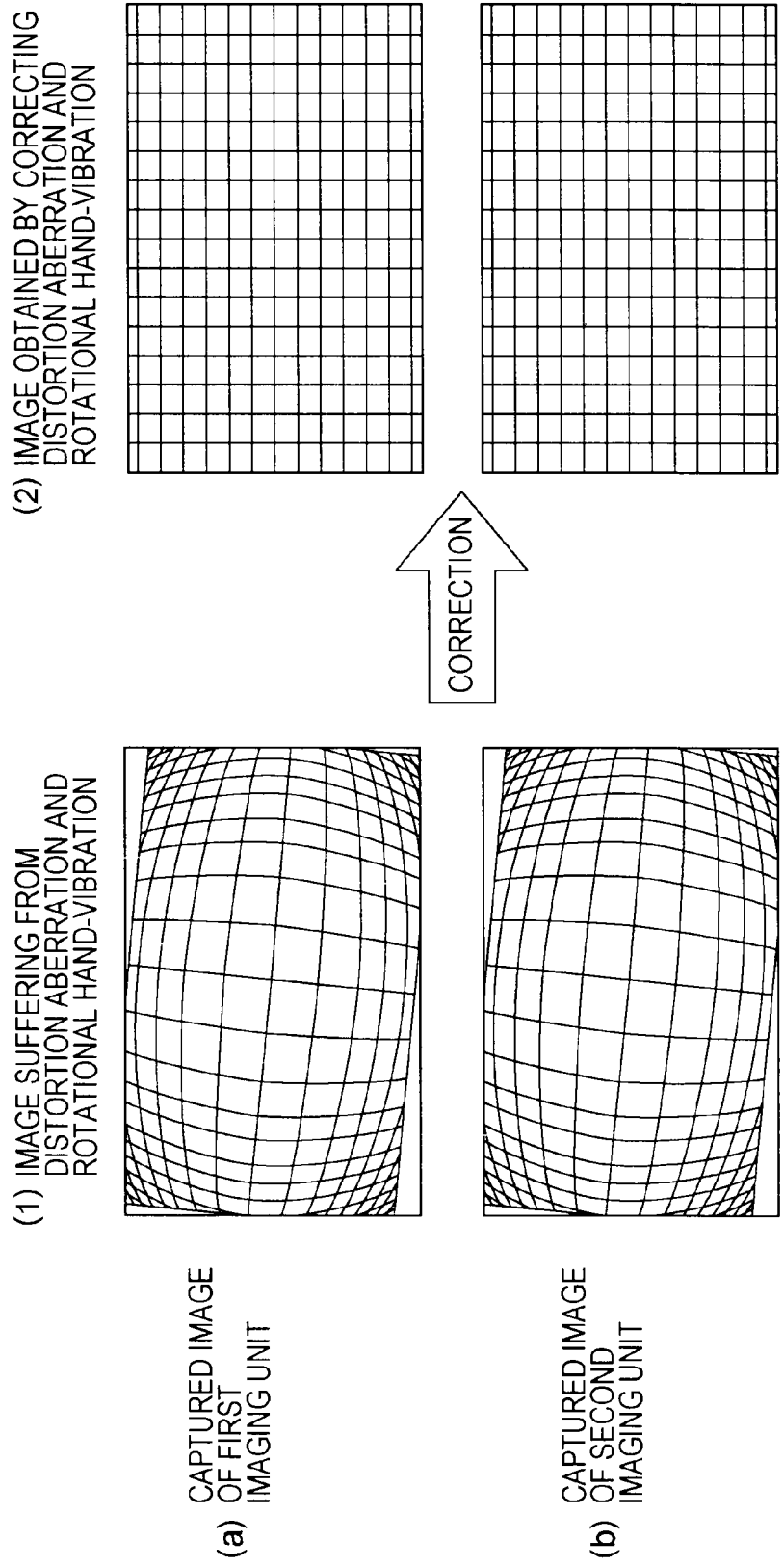
FIG. 11 is a diagram illustrating a correction example of distortion aberration correction and rotational hand-vibration correction.

FIG. 11 illustrates images suffering from barrel distortion aberration and rotational hand-vibration before and after the correction. In each of two optical imaging units, images having barrel distortion aberration and rotational hand-vibration are captured, and both images are slightly different as much as the difference in their installation positions. Both of the two captured images are circularly inflated like a barrel due to lens distortion aberration as shown in FIG. 9A, and rotational hand-vibration is generated with respect to the axis parallel to the lens optical axis. For these images, by executing barrel distortion aberration correction and rotational hand-vibration correction, they are returned to the grid-shaped object perpendicularly extending across the length and the breadth (or distortion is alleviated). Further, parallax of both eyes is corrected, so that a final output image is obtained in a state that a user can comfortably view the image.

3. Sequence of Image Correction Process in Imaging Apparatus

Next, a sequence of the image correction process in the imaging apparatus according to the disclosure will be described.

3-1. Correction Sequence of Individual Correction Processes

Figure 12:
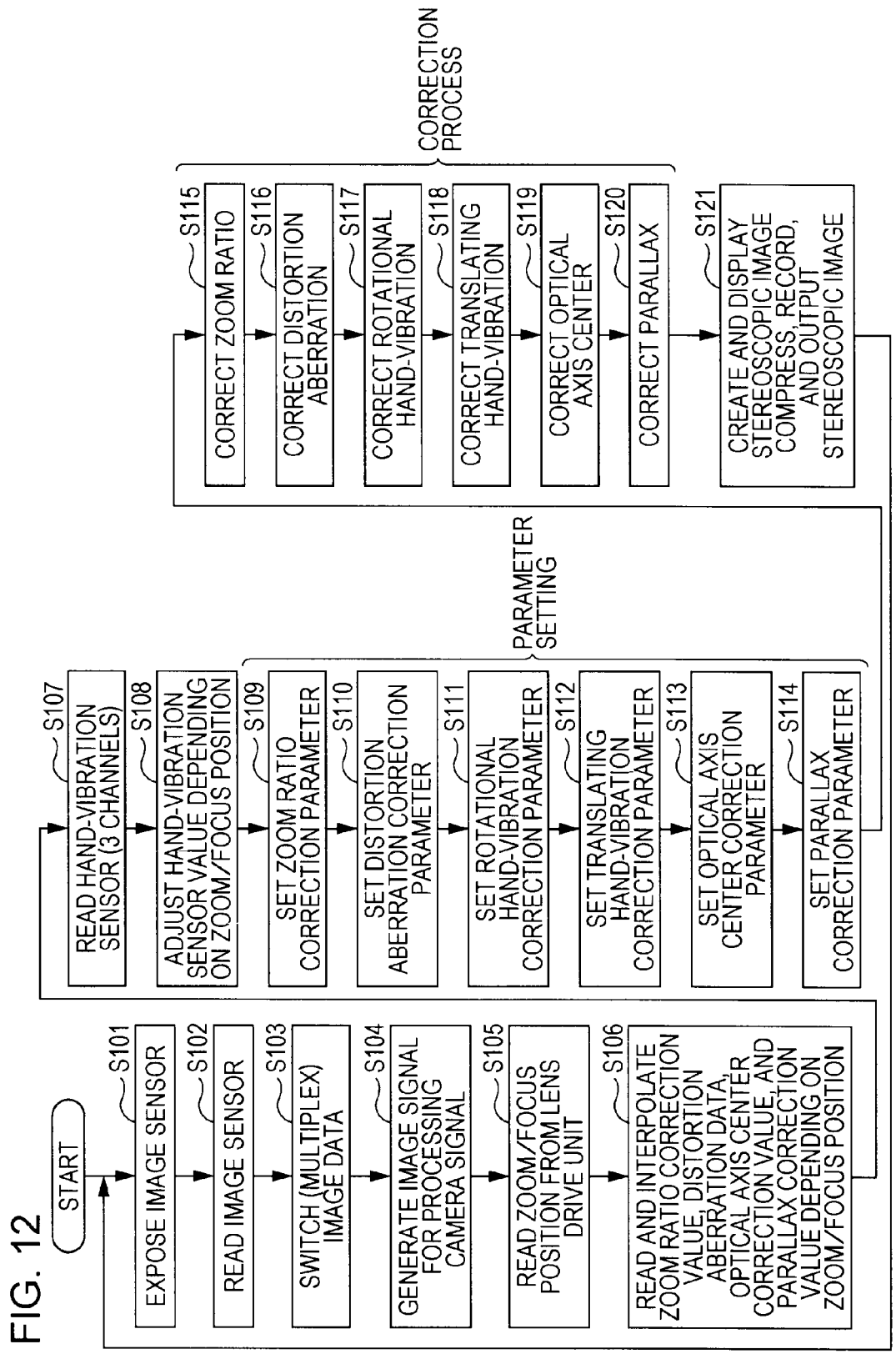
FIG. 12 is a flowchart illustrating a sequence of the image correction process executed by the image processing apparatus according to an embodiment of the disclosure.
Figure 13:
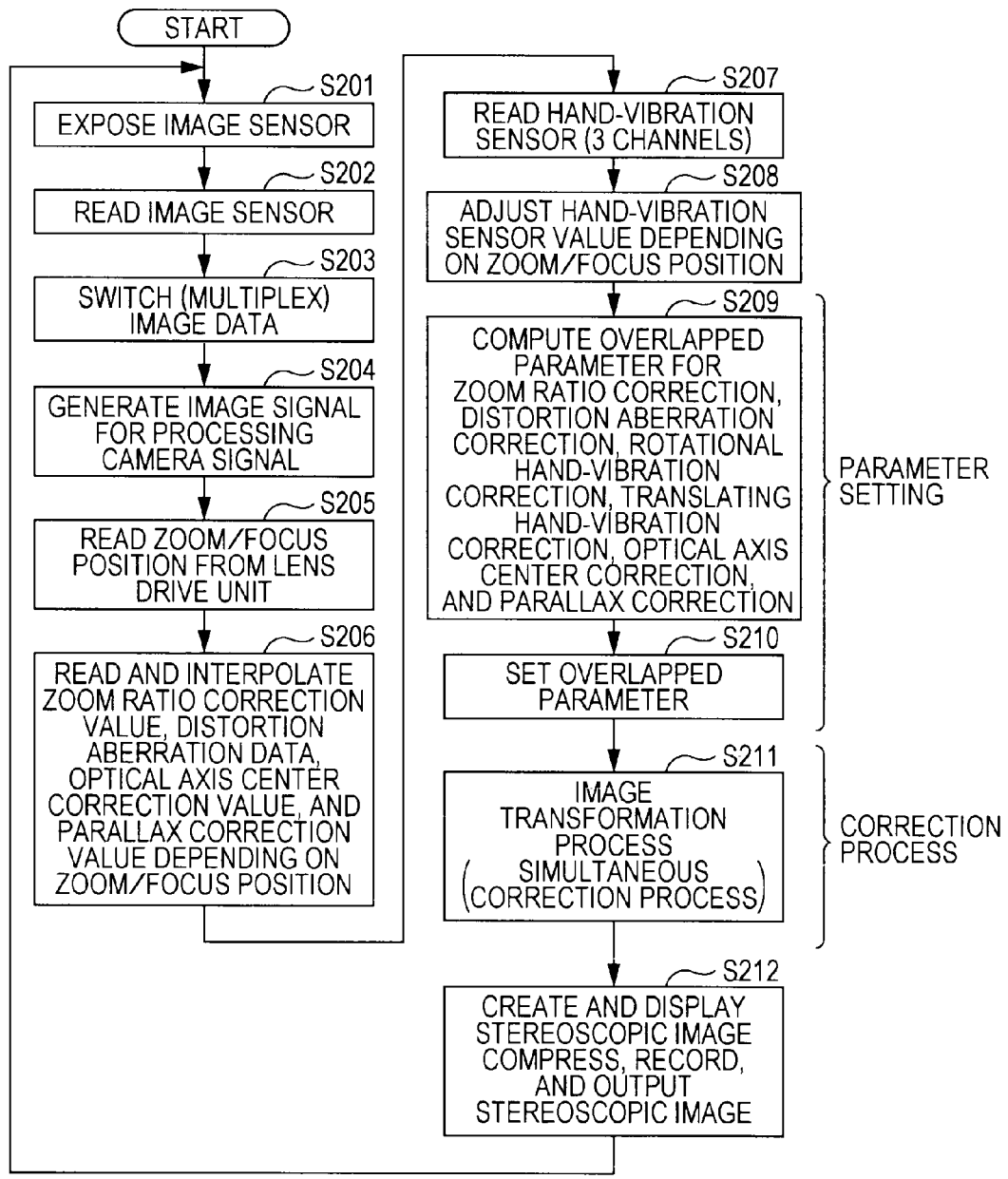
FIG. 13 is a flowchart illustrating a sequence of the image correction process executed by the image processing apparatus according to an embodiment of the disclosure.

FIGS. 12 and 13 are flowcharts illustrating a processing sequence of the image correction processes in the imaging apparatus according to the disclosure.

FIG. 12 illustrates a processing flow corresponding to the device shown in FIGS. 1A and 1B, or 2A and 2B. That is, FIG. 12 illustrates a sequence flow of the image correction processes in the device having individual correction units corresponding to each correction purpose. FIG. 13 illustrates a processing flow corresponding to the device of FIGS. 3A and 3B. That is, FIG. 13 illustrates a sequence flow of the image correction processes in the device having the image transformation correction unit 251 that collectively execute a plurality of correction processes corresponding to a plurality of correction purposes.

First, a sequence of the image correction processes of the device of FIGS. 1A and 1B, or 2A and 2B, that is, the device having individual correction units corresponding to each correction purpose will be described with reference to the flow of FIG. 12.

First, exposure is performed using the image sensors of two imaging units in step S101, and the imaging light is converted into an electric signal and read by the image sensors in step S102. In the images read by the image sensors, distortion aberration is generated due to characteristics of the lens of the imaging unit, and user hand-vibration or vibration of the image is generated under various imaging conditions. In addition, the optical zoom ratios may not accurately match each other due to a variation in the lens unit of the imaging unit, or the coordinates of the optical axis center may not match each other due to an installation variation between the lens unit and the image sensor. Furthermore, two images input from the image sensors of two imaging units have parallax depending on a distance of the installation position of the imaging unit.

In step S103, two image signals captured in the two imaging units are output to the camera signal processing unit 151 while they are switched in the switched multiplexing unit 141 at regular time intervals in the configuration of FIGS. 1A and 1B. In the case of the configuration of FIGS. 2A and 2B, two image signals captured in the two imaging units are individually output to the corresponding camera signal processing units 151 and 201. In step S104, the camera signal processing unit executes a process for converting the image signals into a predetermined format suitable for the correction unit.

Then, in step S105, the control unit reads the zoom lens position and the focus lens position from the lens drive unit.

Then, in step S106, the control unit performs a process of reading the data necessary in the correction process depending on such obtained values or computes the correction value applied to computation of the correction parameters in each correction unit. Furthermore, an interpolation process of the correction value, (that is, in a case where it is difficult to directly obtain the correction value from the correction value storage unit, the necessary correction value is computed from a plurality of correction values) and the like are executed as necessary. As the interpolation process, for example, linear interpolation using neighboring correction values and the like may be executed.

Specifically, for example, the following processing is executed.

The processing includes: a process of obtaining zoom/focus positions from the lens drive unit and computing the zoom ratio correction value for providing it to the zoom ratio correction unit; a process of reading distortion aberration data corresponding to each lens position during the imaging from the distortion aberration data storage unit, that is, a process of obtaining distortion aberration data for computing parameters applied to the distortion aberration correction process in the distortion aberration correction unit, obtaining optical axis center correction data applied to the correction in the optical axis center correction unit from the optical axis center correction value storage unit, and obtaining parallax data for providing it to the parallax correction unit from the optical system parallax data storage unit; and an interpolation process for computing the correction value if it is difficult to directly obtain the correction value.

As the data applied in each correction process for the correction, such as optical zoom ratio correction, lens distortion aberration correction, optical axis center coordinate correction, and parallax correction executed by the apparatus of the disclosure, for example, the following data obtained from each configuration unit of FIGS. 1A and 1B are applied. The data includes: zoom/focus position information obtained from the lens drive units 114 and 124; distortion aberration data obtained from the distortion aberration data storage units 115 and 125; parallax data obtained from the optical system parallax data storage unit 131; zoom ratio correction data obtained from the zoom ratio correction value storage unit 132; and optical axis center correction data obtained from the optical axis center correction value storage unit 133.

The distortion aberration data storage units 115 and 125, the optical system parallax data storage unit 131, the zoom ratio correction value storage unit 132, and the optical axis center correction value storage unit 133 store data corresponding to the positions of various zoom lenses or focus lenses in advance.

Figure 14:
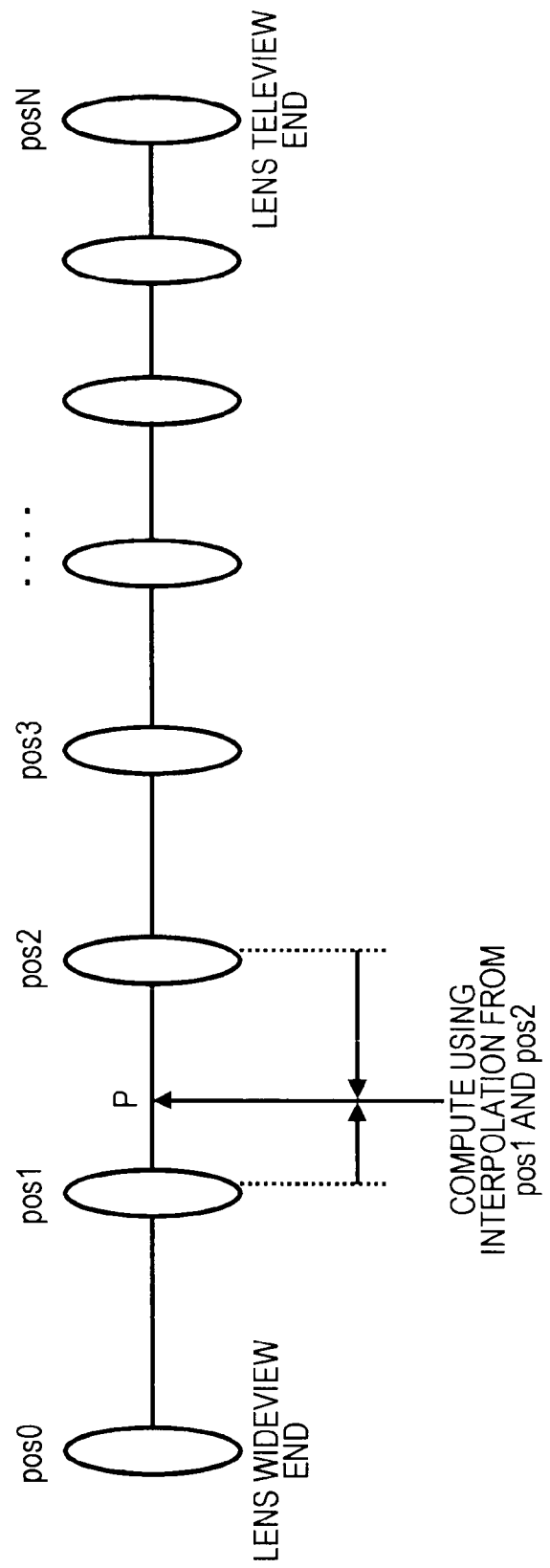
FIG. 14 is a diagram illustrating an exemplary process for setting and obtaining correction data depending on the zoom or focus lens position.

FIG. 14 is a diagram illustrating a state in which such data is discretely stored. In the configuration in which the zoom lens or the focus lens is actuated end to end of the movable range, several representative points (posX) to posN) of the lens position are provided, and each correction value is discretely stored at these points. In the example of the drawings, the representative points (posX) are set with an equal distances. The data as the correction values corresponding to such representative points are discretely stored in the distortion aberration data storage units 115 and 125, the optical system parallax data storage unit 131, the zoom ratio correction value storage unit 132, and the optical axis center correction value storage unit 133.

The representative points may be arranged at equal distances or may be densely provided in a range where the data conversion rate is large. In arbitrary lens positions other than the representative points, the correction values are computed through an interpolation process based on the neighboring setup values. The interpolation value computation is executed, for example, in the control unit.

As shown in FIG. 14, for example, the correction value of the representative point 1 (pos1) and the correction value of the representative point 2 (pos2) can be obtained from the data storage unit. However, in a case where the lens position at the time of actual imaging is a point P between the representative point 1 (pos1) and the representative point 2 (pos2), the correction values of the representative point 1 (pos1) and the representative point 2 (pos2) are obtained, and based on these correction values, the correction value corresponding a lens position between the representative point 1 (pos1) and the representative point 2 (pos2) is computed through a primary interpolation. Furthermore, the correction value may be obtained through higher-order interpolation by increasing the number of points such as the representative point 0 (pos0) and the representative point 3 (pos3).

In addition, the parallax data read from the optical system parallax data storage unit are parallax data corresponding to the object distance. The control unit obtains respective lens position information at the time of imaging from the lens drive unit, computes a distance to the main object in the captured image based on the obtained lens position information, and obtains, from the parallax data storage unit, parallax data for adjusting the parallax of both eyes depending on the distance.

Description will be continued returning to the flow of FIG. 12. After the process of step S106 is terminated, in steps S107 and S108, the hand-vibration sensor values for three channels including horizontal, vertical, and rotational directions are read from the hand-vibration sensor, and the obtained hand-vibration sensor values are adjusted depending on each lens position based on the relational data between the zoom lens position and the adjustment gain of the hand-vibration sensor value described with reference to FIG. 6 in advance and the like to compute the adjustment value of the hand-vibration sensor value for computing the correction parameters provided to the rotational hand-vibration correction unit and the translating hand-vibration correction unit.

First, as described with reference to FIG. 6, even when the hand-vibration sensor values are identical, the larger hand-vibration in the vertical/horizontal directions appears on the image as the zoom lens position is located closer to the tele-view side. The control unit reads the adjustment gain value of FIG. 6 from the look-up table that contains such a value in advance in a memory and multiplies it by the value read by the hand-vibration sensor to adjust the input value from the hand-vibration sensor.

The process of steps S109 to S114 is a process of computing the correction parameters applied to the correction process in each correction unit of FIGS. 1 and 2. This parameter computation process is executed by the control unit. In addition, the data necessary in the parameter computation may be provided from the control unit to each correction unit so that parameters may be computed in each correction unit.

In step S109, the zoom ratio correction unit computes the zoom ratio correction parameter. The zoom ratio correction parameter is set based on the zoom ratio correction value computed by the control unit based on the zoom/focus position information obtained from the lens drive unit. In step S110, the distortion aberration correction unit computes the distortion aberration correction parameter. The distortion aberration correction parameter is computed based on the distortion aberration data corresponding to each lens position at the time of imaging read from the distortion aberration data storage unit.

In step S111, the rotational hand-vibration correction unit computes the rotational hand-vibration correction parameter. The rotational hand-vibration correction parameter is computed based on the adjustment value of the rotational hand-vibration sensor value read from the hand-vibration sensor in steps S107 to S108, that is, the adjustment value adjusted based on the relational data between the adjustment gain of the hand-vibration sensor and the zoom lens position described with reference to FIG. 6, and the like.

In step S112, the translating hand-vibration correction unit computes the translating hand-vibration correction parameter. The translating hand-vibration correction parameter is computed based on the adjustment value of the horizontal and vertical hand-vibration sensor value read from the hand-vibration sensor in step S107 and S108, that is, the adjustment value adjusted based on the relational data between the adjustment gain of the hand-vibration sensor value and the zoom lens position described with reference to FIG. 6, and the like.

In step S113, the optical axis center correction unit computes the optical axis center correction parameter. The optical axis center correction parameter is computed based on the optical axis center correction data read from the optical axis center correction value storage unit.

In step S114, the parallax correction unit computes the parallax correction parameter. The parallax correction parameter is computed based on the parallax data read from the optical system parallax data storage unit. In addition, as described above, the parallax data read from the optical system parallax data storage unit is data for adjusting parallax between both eyes depending on the distance to the main object in the captured image and is computed by the control unit based on respective lens position information at the time of imaging. The parallax correction parameter is computed based on the parallax data depending on the object distance.

Next, in steps S115 to S120, correction processes of each correction unit of FIGS. 1 and 2 are executed.

In steps S115 to S120, the following correction processes are sequentially executed. In step S115, the zoom ratio correction unit executes the zoom ratio correction process by applying the zoom ratio correction parameter.

In step S116, the distortion aberration correction unit executes the distortion aberration correction process by applying the distortion aberration correction parameter.

In step S117, the rotational hand-vibration correction unit executes the rotational hand-vibration correction process by applying the rotational hand-vibration correction parameter.

In step S118, the translating hand-vibration correction unit executes the translating hand-vibration correction process by applying the translating hand-vibration correction parameter.

In step S119, the optical axis center correction unit executes the optical axis center correction process by applying the optical axis center correction parameter.

In step S120, the parallax correction unit executes the parallax correction process by applying the parallax correction parameter.

In addition, each correction process of steps S116 to S120 is executed by alternately switching the image captured by the first imaging unit 111 and the image captured by the second imaging unit 121 in the case of the configuration of FIGS. 1A and 1B. Meanwhile, in the case of the configuration of FIGS. 2A and 2B, the correction processes of the image captured by the first imaging unit 111 and the image captured by the second imaging unit 121 are executed in parallel in each correction unit.

As each correction process of steps S116 to S120 is completed, the process advances to step S122. In step S122, a process of displaying 3D images by applying the correction image based on the image captured by the first imaging unit 111 and the correction image based on the image captured by the second imaging unit 121 is executed using the imaging display unit. Alternatively, a set of the corrected image data is compressed and recorded in the image storage medium or output from an output terminal to an outer side.

3-2. Sequence of Correction for Collectively Executing Plurality of Correction Processes Next, a sequence of processes corresponding to the devices of FIGS. 3A and 3B, that is, a sequence of image correction processes in the apparatus having the image transformation correction unit 251 that collectively executes a plurality of correction processes corresponding to a plurality of correction purposes will be described with reference to the flowchart of FIG. 13.

In steps S201 to S208, the same processes as those of steps S101 to S108 described with reference to FIG. 12 are executed.

First, in step S201, exposure is performed using the image sensors of two imaging units. In step S202, the imaging light is converted into an electric signal, and read from the image sensor. In step S203, the two image signals captured by two imaging units are output to the camera signal processing unit 151 while they are switched by the switched multiplexing unit 141 having the configuration of FIGS. 3A and 3B at regular time intervals.

In step S204, the camera signal processing unit executes a process of converting the image signal into a predetermined format suitable for the correction unit. Then, in step S205, the control unit reads the zoom lens position and the focus lens position from the lens drive unit. Then, in step S206, depending on the obtained values, the control unit reads the data necessary in the correction processes or computes the correction values applied to computation of the correction parameters in each correction unit. Furthermore, if necessary, an interpolation process and the like are executed to compute the correction value that is not directly obtained from the correction value data storage unit.

In step S206, for example, the following process is executed as described above in the process of step S106 of FIG. 12. The process includes: obtaining the zoom/focus position from the lens drive unit and computing the zoom ratio correction value for providing it to the zoom ratio correction unit; and reading the distortion aberration data corresponding to each lens position at the time of imaging from the distortion aberration data storage unit, that is, including obtaining the distortion aberration data for computing parameters applied to the distortion aberration correction process in the distortion aberration correction unit; obtaining the optical axis center correction data applied to correction in the optical axis center correction unit from the optical axis center correction value storage unit; obtaining parallax data for providing the parallax data to the parallax correction unit from the optical system parallax data storage unit; and an interpolation process for computing the correction value that is not directly obtained.

Then, in steps S207 to S208, the hand-vibration sensor values of the horizontal direction of the three channels, the vertical direction, and the rotational direction are read from the hand-vibration sensor. The adjustment values of the hand-vibration sensor values for computing the correction parameters provided to the rotational hand-vibration correction unit and the translating hand-vibration correction unit are computed by adjusting the hand-vibration sensor values obtained depending on each lens position based on the relational data between the zoom lens position and the adjustment gain of the hand-vibration sensor value and the like described above with reference to FIG. 6.

Next, in steps S209 and S210, a process unique to the configuration of FIGS. 3A and 3B is executed. In a case where the image transformation correction unit 251 obtained by integrating each correction unit is provided as shown in FIGS. 3A and 3B, the control unit computes the correction parameters corresponding to individual correction purposes and then computes a single correction parameter by combining a plurality of the computed correction parameters.

That is, the control unit computes a combined correction parameter by combining the following correction parameters applied to the correction processes in each correction unit of FIGS. 1 and 2.

The correction parameters include:
(a) a zoom ratio correction parameter applied to the zoom ratio correction process in the zoom ratio correction unit;
(b) a distortion aberration correction parameter applied to the distortion aberration correction process in the distortion aberration correction unit;
(c) a rotational hand-vibration correction parameter applied to the rotational hand-vibration correction process in the rotational hand-vibration correction unit;
(d) a translating hand-vibration correction parameter applied to the translating hand-vibration correction process in the translating hand-vibration correction unit;
(e) an optical axis center correction parameter applied to the optical axis center correction process in the optical axis center correction unit; and
(f) a parallax correction parameter applied to the parallax correction process in the parallax correction unit.

The combined correction parameter is computed by combining such correction parameters applied to each correction process.

In order to combine the correction parameters, a sum of each coordinate transformation vectors may be obtained.

That is, a combined correction vector

=zoom ratio correction vector+distortion aberration correction vector+rotational hand-vibration correction vector+translating hand-vibration correction vector+optical axis center correction vector+parallax correction vector.

The image transformation correction unit 251 performs the coordinate transformation process using the combined correction vector.

In addition, the combined correction vector as the combined parameter is computed in the unit of each captured image such as the image captured by the first imaging unit 111 and the image captured by the second imaging unit 121.

The control unit 172 of FIG. 3B computes the combined correction parameter by combining the correction parameters of the aforementioned parameters (a) to (f) and provides the combined correction parameter to the image transformation correction unit 251. In addition, the control unit 172 may compute the combined correction parameter by obtaining or computing the data necessary in the combined parameter computation process and providing this data from the control unit to the image transformation correction unit 251.

In step S211, the image transformation correction unit 251 executes the image correction process by applying the combined correction parameter. In step S212, the image display unit executes a 3D image display process using the correction image created by the image correction process by applying the combined correction parameter to the image captured by the first imaging unit 111 and the correction image created by the image correction process by applying the combined correction parameter to the image captured by the second imaging unit 121. Alternatively, a set of the corrected image data may be compressed or recorded on an image storage medium or output from an output terminal to the outer side.

4. Correction Vectors as Correction Parameters Corresponding to Correction Purposes Next, correction vectors as correction parameters corresponding to correction purposes will be described.

The correction processes executed for the captured images in the apparatus of FIGS. 1 to 3 include:
(a) a zoom ratio correction process;
(b) a distortion aberration correction process;
(c) a rotational hand-vibration correction process;
(d) a translating hand-vibration correction process;
(e) an optical axis center correction process; and
(f) a parallax correction process.

As described above with reference to FIGS. 3A and 3B, any one of such correction processes can be executed as a coordinate transformation process for the captured image.

As the correction parameter applied to the aforementioned correction processes (a) to (f), a coordinate transformation vector for executing the coordinate transformation process may be used. That is, the coordinate transformation vector is a vector for transforming each pixel position of the image before the correction into the pixel position of the image after the correction.

In the configuration of the device of FIGS. 1A and 1B, or 2A and 2B, as the correction parameter in each correction unit, the following individual vectors are computed, and the coordinate transformation using the correction vectors is executed in each correction unit. The individual vectors include:
(a) a correction vector as the zoom ratio correction parameter applied to the zoom ratio correction process;
(b) a correction vector as the distortion aberration correction parameter applied to the distortion aberration correction process;
(c) a correction vector as the rotational hand-vibration correction parameter applied to the rotational hand-vibration correction;
(d) a correction vector as the translating hand-vibration correction parameter applied to the translating hand-vibration correction process;

(e) a correction vector as the optical axis center correction parameter applied to the optical axis center correction process; and (f) a correction vector as the parallax correction parameter applied to the parallax correction process.

Hereinafter, an example of the correction vectors applied to each correction process of the aforementioned vectors (a) to (f) will be described.

Figure 15:
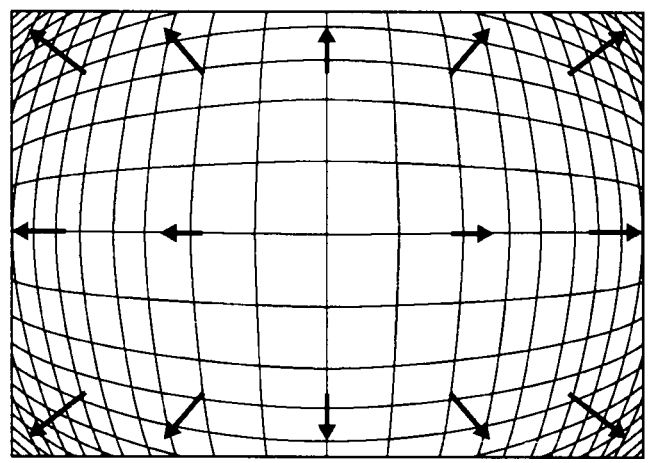
FIG. 15 is a diagram illustrating an exemplary correction vector as a zoom ratio correction parameter applied to the zoom ratio correction process.

4-1. (a) Correction Vector as Zoom Ratio Correction Parameter Applied to Zoom Ratio Correction Process FIG. 15 illustrates exemplary correction vectors as the zoom ratio correction parameter applied to the zoom ratio correction process. The vectors (arrows) shown in the image are correction vectors.

The zoom ratio correction vectors are the same vectors as those shown in FIG. 15. For example, the vectors for moving the pixel positions to match the optical zoom ratios are slightly different between a plurality images obtained from a plurality of imaging units such as the imaging units 111 and 121 of FIG. 1A are used in the zoom ratio correction process. The vector setting of FIG. 15 is an exemplary setting of the zoom ratio correction vectors, that is, an exemplary setting of vectors for performing a magnification process through the image processing. Through the coordinate transformation process using the zoom ratio correction vectors, it is possible to match the optical zoom ratios between a plurality of images obtained from a plurality of imaging units such as the imaging units 111 and 121 of FIG. 1A in any zoom position. In addition, to reduce the size of the image, the correction vectors are set to be directed to the direction opposite to that of FIG. 13, that is, from the circumference to the center.

Although FIG. 15 illustrates only 14 vectors in the image, they are representative vectors corresponding to the representative points set in the image. The vectors corresponding to the pixel positions of arbitrary coordinates other than the representative points are computed by an interpolation process using the vectors of the neighboring representative points, and the coordinate transformation is performed based on those vectors. This is similar to other correction processes using the correction vectors described below.

Figure 16A:
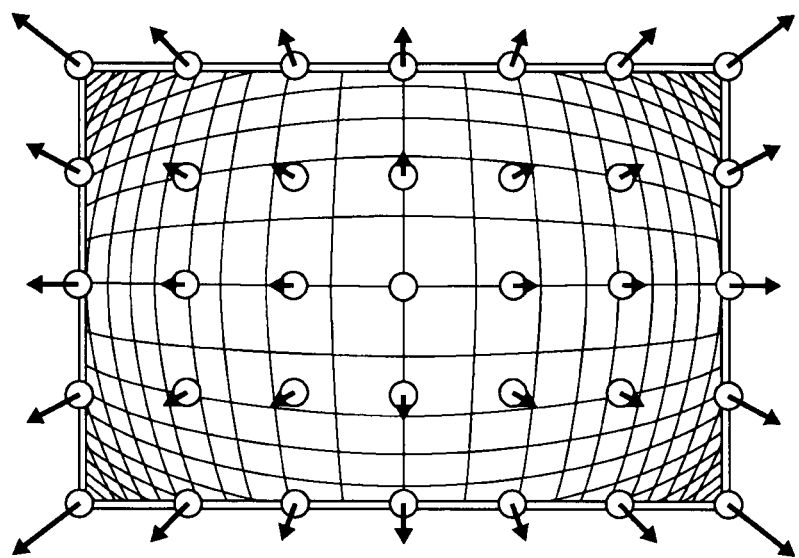
FIG. 16 is a diagram illustrating an exemplary process for generating an interpolation vector and an exemplary setting of the representative points.

An exemplary setting of the representative points and an exemplary process for creating interpolation vectors will be described with reference to FIGS. 16A and 16B. FIG. 16A illustrates an exemplary grid-shaped representative point arrangement, in which the representative points are regularly arranged across the length and the breadth. In arbitrary coordinates other than the representative points, the vectors are computed through an interpolation process from the vectors of neighboring representative points.

Figure 16B:
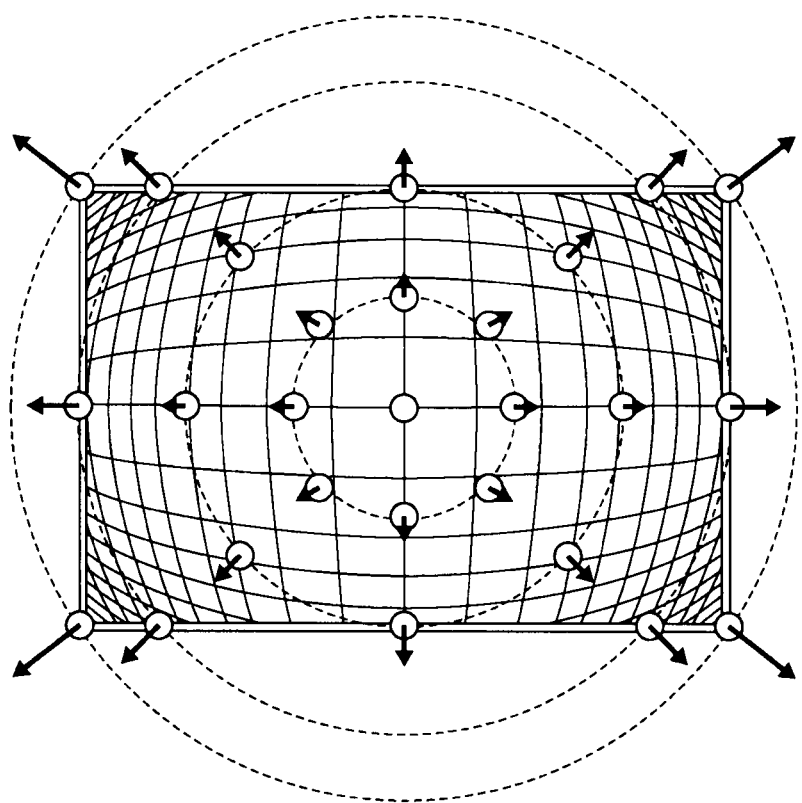

FIG. 16B illustrates an exemplary arrangement in which the representative points are concentrically arranged with respect to the optical axis considering that the lens distortion aberration varies depending on the image height (a distance from the optical axis center). In the vicinity of the image center near the optical axis, the vectors are small. The further out to the outer side of the image, the larger the magnitude of the vector, and the change rate is apt to increase. Therefore, the representative points are preferably arranged more densely the further to the outer side of the image. Similarly, in arbitrary coordinates other than the representative points, the vectors are computed through the interpolation process from the neighboring vectors or the distance computation from the optical axis center.

4-2. (b) Correction Vectors as Distortion Aberration Correction Parameter Applied to Distortion Aberration Correction Process The correction vectors as the distortion aberration correction parameters applied to the distortion aberration correction process is described above with reference to FIG. 7A. As described above with reference to FIG. 7A, the vectors shown in FIG. 7A are an exemplary setting of the correction vectors for the image having barrel distortion aberration. The vectors (arrows) shown in the image are correction vectors.

If barrel distortion aberration is generated when a grid-shaped object perpendicular extending across the length and the breadth is captured, the straight lines extending across the length and the breaths in the captured image are outwardly circularly inflated and skewed like a barrel. The vectors for correction of this phenomenon are set such that the image is enlarged in the lens outer side depending on the distance from the lens center (in the vicinity of the image center) as shown in FIG. 7A. Typically, the farther from the lens center, the more the magnitude of the correction vector increases to the outer side of the lens.

In addition, as described above with reference to FIGS. 4A and 4B, distortion aberration includes barrel distortion, pin-cushion distortion, and a mixture of both types (for example, mustache distortion). The aspects of such distortion aberration differ depending on the lens configuration of the imaging apparatus or the lens position at the time of imaging. The control unit reads optimal distortion aberration data from the distortion aberration data storage unit depending on the lens position at the time of imaging and sets the distortion aberration correction vectors based on the read data.

4-3. (c) Correction Vectors as Rotational Hand-Vibration Correction Parameter Applied to Rotational Hand-Vibration Correction Process Next, the correction vectors as the rotational hand-vibration correction parameter applied to the rotational hand-vibration correction process will be described.

The correction vectors as the rotational hand-vibration correction parameter applied to the rotational hand-vibration correction process is described above with reference to FIGS. 8A to 8E. All of the examples described with reference to FIGS. 8A to 8E are exemplary settings of the rotational hand-vibration correction vectors in a case where counterclockwise rotational hand-vibration is generated in the imaging apparatus side, and as a result, the image is captured with a counterclockwise inclination.

As described above with reference to FIGS. 8A to 8E, the setting of the correction vectors is changed depending on where the rotational correction center is located in the image. However, the rotational correction center may not necessarily be an actual rotational vibration center, and may be virtually provided when the correction vectors are set. Although it is preferable that the rotational correction center not be significantly separated from the image in order to maintain accuracy of the setting value of the correction vector, the rotational correction center may be conveniently set in either an inner or outer side.

FIGS. 8A to 8E illustrate an exemplary vector setting based on the setting of the rotational correction center in each different position.

The control unit reads the rotational hand-vibration sensor value from the hand-vibration sensor, adjusts the obtained hand-vibration sensor value depending on each lens position based on the relational data between the adjustment gain of the hand-vibration sensor value and the zoom lens position described above with reference to FIG. 6, computes the adjustment value of the hand-vibration sensor value, and computes the rotational hand-vibration correction vectors, for example, corresponding to the representative points of FIGS. 8A to 8E based on this computed adjustment value.

As described above with reference to FIG. 6, even when the hand-vibration sensor values are equal, as the zoom lens position is closer to the teleview side, the horizontal and vertical hand-vibration appears to be larger in the image. The control unit reads the adjustment gain value of FIG. 6, for example, from a look-up table stored in a memory in advance, and multiplies the adjustment gain value by the value read from the hand-vibration sensor in order to adjust the input value from the hand-vibration sensor.

4-4. (d) Correction Vector as Translating Hand-Vibration Correction Parameter Applied to Translating Hand-Vibration Correction Process Next, correction vectors as the translating hand-vibration correction parameter applied to the translating hand-vibration correction process will be described. Similarly, the translating hand-vibration correction vectors are described above with reference to FIG. 7B.

FIG. 7B is a diagram illustrating an exemplary setting for the correction vector for the image having translating hand-vibration. Vectors (arrows) in the image are correction vectors. FIG. 7B illustrates an exemplary setting of the correction vectors for the image, in which the translating hand-vibration is generated due to a movement from the upper right to the lower left while the image is captured.

First, as described above with reference to FIG. 7B, when the imaging apparatus is vibrated in up/down/left/right directions due to hand-vibration, the vibration is canceled out by shifting the entire image obtained by the image sensor as much as the vibration and cutting out the image. The translating hand-vibration correction vectors correspond to the vectors for determining the start position thereof. Values indicating each movement amount in the X-axis vibration sensor and the Y-axis vibration sensor described above with reference to FIG. 5 are obtained, and the shift direction and the shift amount are computed based on these values. The setting of the vectors is made based on the computed shift direction and the shift amount.

4-5. (e) Correction Vectors as Optical Axis Center Correction Parameter Applied to Optical Axis Center Correction Process Next, the correction vectors as the optical axis center correction parameter applied to the optical axis center correction process will be described with reference to FIG. 17.

Figure 17:
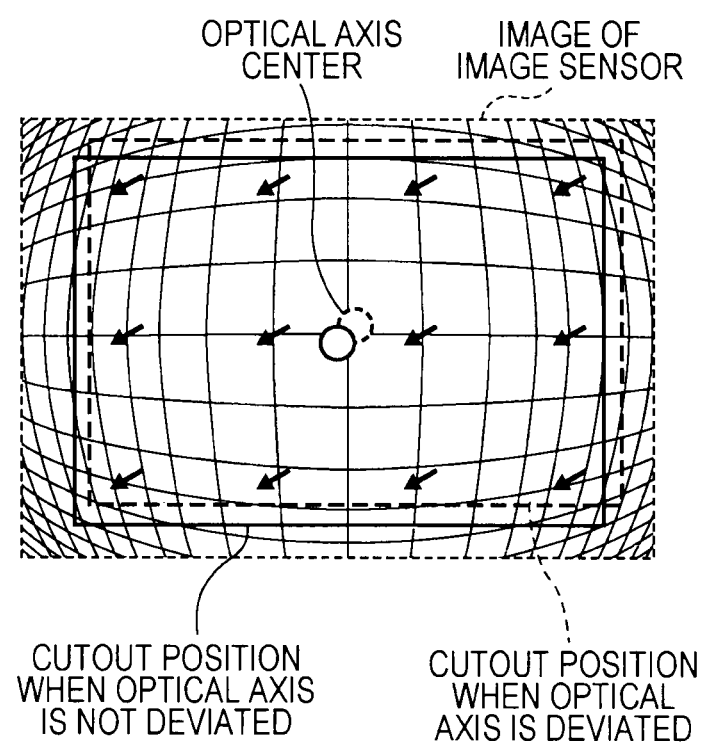
FIG. 17 is a diagram illustrating a correction vector as an optical axis center correction parameter applied to the optical axis center correction process.

FIG. 17 illustrates an exemplary setting of the correction vector as the optical axis center correction parameter applied to the optical axis center correction process.

The optical axis center correction vector shown in FIG. 17 illustrates an exemplary vector setting in which the entire image is translated and cut out in order to match the coordinates of the optical axis center slightly different between a plurality of images obtained from a plurality of imaging units with each other. Through the coordinate transformation process by applying this vector, it is possible to match the center coordinates between a plurality of images depending on the zoom or focus lens condition.

4-6. (f) Correction Vectors as Parallax Correction Parameter Applied to Parallax Correction Next, correction vectors as the parallax correction parameter applied to the parallax correction process will be described.

The parallax correction vector is described above with reference to FIGS. 9A and 9B. FIGS. 9A and 9B illustrate:

(a) an image captured by the first imaging unit; and
(b) an image captured by the second imaging unit.

Vectors (arrows) illustrated in the image captured by (a) the first imaging unit are parallax correction vectors. For example, in the configuration of FIGS. 1A and 1B, the image captured by the first imaging unit 111 and the image captured by the second imaging unit 121 are slightly different due to a different lens installation position.

In the parallax correction unit 157, it is necessary to obtain the correction data from the optical system parallax data storage unit 131 such that the stereoscopic image including both types of images has suitable parallax, and perform the parallax correction for any one of the image captured by the first imaging unit 111 and the image captured by the second imaging unit 121. The vectors applied to the correction process are, for example, the vectors i shown in FIGS. 9A and 9B. Typically, the parallax correction can be realized by translating the images and performing a magnification/reduction process as necessary. Any one of the case where the parallax correction data is adjusted depending on the distance from the imaging apparatus to each object, or the case where fixed data is used is applied.

As described above, in the device configuration of FIGS. 1A and 1B, or 2A and 2B, each correction unit computes individual correction vectors depending on each correction purpose as the correction parameter, and sequentially executes the coordinate transformation using the correction vectors in each correction unit.

Figure 18:
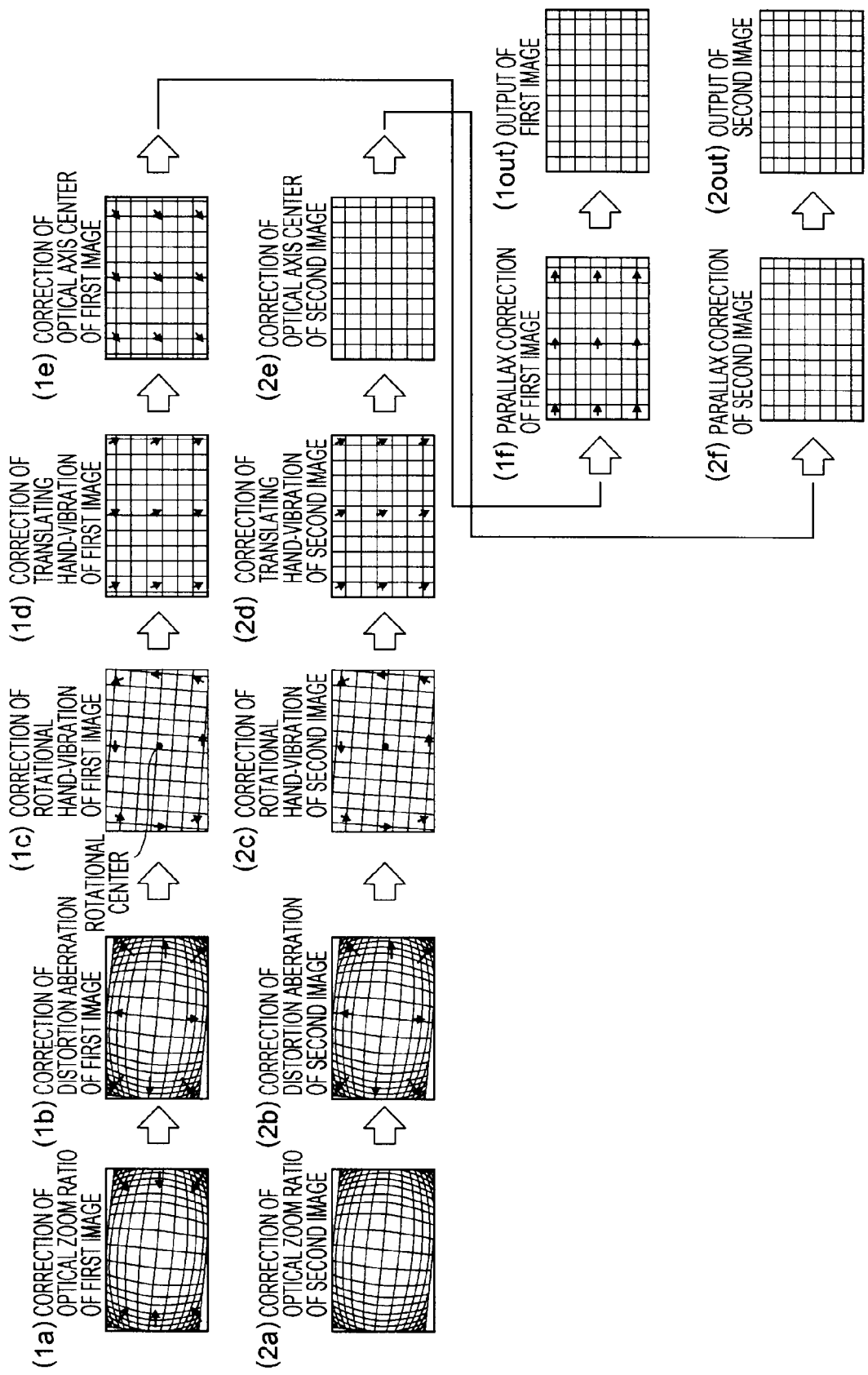
FIG. 18 is a diagram illustrating an exemplary processing when the correction process is executed by applying the correction vector using each correction unit.

FIG. 18 illustrates a processing example in which correction processes are executed by applying the correction vectors corresponding to each correction unit in the device configuration of FIGS. 1A and 1B, or 2A and 2B.

FIG. 18 illustrates an example of the correction vectors and the output images when the following correction processes are sequentially executed using the device configuration of FIGS. 1A and 1B, or 2A and 2B.

(a) a zoom ratio correction process,
(b) a distortion aberration correction process,
(c) a rotational hand-vibration correction process,
(d) a translating hand-vibration correction process,
(e) an optical axis center correction process, and
(f) a parallax correction process.

In FIG. 18, a series of images $(1a) \rightarrow (1f) \rightarrow (1\text{OUT})$ illustrate a correction process for the output image of the first imaging unit 111 of FIGS. 1 and 2, and a series of images $(2a) \rightarrow (2f) \rightarrow (2\text{OUT})$ illustrate a correction process for the output image of the second imaging unit 121 of FIGS. 1 and 2.

The vectors (arrows) in each image are correction vectors of the representative points applied in each correction process.

First, for the output images of two imaging units, that is, the first and second imaging units 111 and 121 of FIGS. 1 and 2, a zoom ratio correction process is executed by applying the zoom ratio correction vector in the zoom ratio correction unit.

This process is shown in the images $(1a)$ and $(2a)$ of FIG. 18. The image $(1a)$ illustrates the output image of the first imaging unit 111 and the zoom ratio correction vectors for the image.

The image (2a) illustrates the output image of the second imaging unit 121.

The zoom ratio correction process is the process described above with reference to FIG. 15 and the like, and a process of matching the zoom ratios between two output images. The zoom ratio correction process can be performed by executing a magnification or reduction process for any one of the images.

In the example of FIG. 18, the image transformation is executed by setting the correction vectors only for the output image of the first imaging unit 111. The setting for the output image of the second imaging unit 121 is correction vector=0.

For the images (1a) and (2a) of FIG. 18, the results of the zoom ratio correction obtained by applying the vectors in the images become (1b) and (2b), respectively, and then, the distortion aberration correction process is executed.

The images (1b) and (2b) of FIG. 18 illustrate the following processes.

(1b) exemplary setting of the distortion aberration correction vector for the zoom ratio correction result image of the output image of the first imaging unit 111, and (2b) exemplary setting of the distortion aberration correction vector for the zoom ratio correction result image of the output image of the second imaging unit 121.

In addition, in this example, since the zoom ratio correction for the output image of the second imaging unit 121 has not been executed substantially, the images (2a) and (2b) are similar raw images.

The distortion aberration correction is the correction, for example, described above with reference to FIG. 7A. For example, the correction vectors for the image having the barrel distortion aberration are set such that the image is magnified in the lens outer side depending on the distance from the lens center (in the vicinity of the image center) as shown in FIG. 7A. Typically, the farther from the lens center the farther from the lens center, the more the magnitude of the correction vector increases toward the lens outer side.

The vectors of the images (1b) and (2b) of FIG. 18 have the same setting as that of the vectors of FIG. 7A and illustrate an exemplary correction vectors for the image having the barrel distortion aberration.

For the images (1b) and (2b) of FIG. 18, the distortion aberration correction process is executed by applying the vectors in the image. The results of the correction become the images (1c) and (2c), respectively. As the distortion aberration is corrected, the curved portion is returned to the straight line, so that a grid-shaped object can be reproduced.

For the images (1c) and (2c) as the distortion aberration correction results, the following rotational hand-vibration correction process is executed.

The images (1c) and (2c) of FIG. 18 illustrate the following processes:

(1c) exemplary setting of the rotational hand-vibration correction vectors for the correction image obtained by executing the zoom ratio correction and the distortion aberration correction for the output image of the first imaging unit 111; and (2c) exemplary setting of the rotational hand-vibration correction vector for the correction image obtained by executing the zoom ratio correction and the distortion aberration correction for the output image of the second imaging unit 121.

The rotational hand-vibration correction executed by the vectors shown in the images (1c) and (2c) of FIG. 18 is the correction, for example, described above with reference to FIGS. 8A to 8E. The example of the images (1c) and (2c) of FIG. 18 is an exemplary setting of the vectors corresponding to the example in which the rotation center is set to the image center as shown in FIG. 8E. As described above with reference to FIGS. 8A to 8E, the setting of the correction vectors is changed depending on where the rotational correction center is provided in the image. However, the rotational correction center is not necessarily an actual rotational vibration center, and may be virtually provided when the correction vectors are set. The vectors are set in predetermined positions.

For the images (1c) and (2c) of FIG. 18, a rotational hand-vibration correction process is executed by applying the vectors shown in the images. The correction results thereof become the images (1d) and (2d). The images (1d) and (2d) are images obtained by removing the rotational components. For the images (1d) and (2d), the following translating hand-vibration correction process is executed.

The images (1d) and (2d) of FIG. 18 illustrate the following processes:

(1d) exemplary setting of the translating hand-vibration correction vectors for the correction images obtained by executing the zoom ratio correction, the distortion aberration correction, and the rotational hand-vibration correction process for the output image of the first imaging unit 111; and (2c) exemplary setting of the translating hand-vibration correction vectors for the correction images obtained by executing the zoom ratio correction, the distortion aberration correction, and the rotational hand-vibration correction process for the output image of the second imaging unit 121.

The translating hand-vibration correction executed by the vectors of the images (1d) and (2d) of FIG. 18 is the correction, for example, described above with reference to FIG. 7B. The example of FIG. 7B illustrates an exemplary setting of the correction vectors for the image, in which the translating hand-vibration is generated due to a movement from the upper right to the lower left while the image is captured. The correction vectors shown in the images (1c) and (2c) of FIG. 18 are an exemplary setting of the correction vectors for the image, in which a translating hand-vibration is generated due to a movement from the lower right to the upper left while the image is captured unlike the example of FIG. 7B.

For the images (1d) and (2d) of FIG. 18, the translating hand-vibration correction process is executed by applying the vectors in the image. The correction result becomes the images (1e) and (2e), and the translating hand-vibration component is removed, so that a stable image can be obtained in a time-axis direction. For the images (1e) and (2e), the following optical axis center correction process is executed.

The images (1e) and (2e) of FIG. 18 illustrate the following processes:

(1e) exemplary setting of the optical axis center correction vector for the correction image obtained by executing the zoom ratio correction, the distortion aberration correction, the rotational hand-vibration correction, and the translating hand-vibration correction process for the output image of the first imaging unit 111; and (2e) exemplary setting of the optical axis center correction vector for the correction image obtained by executing the zoom ratio correction, the distortion aberration correction, the rotational hand-vibration correction, and the translating hand-vibration correction process for the output image of the second imaging unit 121.

However, the optical axis center correction can be performed just by executing the correction for any one of the images. In this example, the correction is executed by setting the vectors only for the first image (1e) of FIG. 18.

The optical axis center correction process executed by the vectors of the images (1e) and (2e) of FIG. 18 is related to, for example, the correction described above with reference to FIG. 17. As described above with reference to FIG. 17, the optical axis center correction vector is set as a vector for translating the entire image and cutting out the image to matching the optical axis center coordinates different between a plurality of images obtained from a plurality of imaging units with each other.

In the images (1e) and (2e) of FIG. 18, the optical axis center correction process is executed by applying the vectors in the images. The correction results become the images (1f) and (2f), and the following parallax correction process is executed.

The images (1f) and (2f) of FIG. 18 illustrate the following processes:

(1f) exemplary setting of the parallax correction vectors for the correction image obtained by executing the zoom ratio correction, the distortion aberration correction, the rotational hand-vibration correction, the translating hand-vibration correction, and the optical axis center correction process for the output image of the first imaging unit 111; and (2f) exemplary setting of the parallax correction vectors for the correction image obtained by executing the zoom ratio correction, the distortion aberration correction, the rotational hand-vibration correction, the translating hand-vibration correction, and the optical axis center correction process for the output image of the second imaging unit 121.

However, the parallax correction can be performed just by executing the correction for any one of the images. In this example, the correction is performed by setting the vectors only for the first image (1f) of FIG. 18.

The parallax correction process executed by the vectors shown in the images (1f) and (2f) of FIG. 18 is related to, for example, the correction described above with reference to FIGS. 9A and 9B. As described above with reference to FIGS. 9A and 9B, the parallax correction is the correction process for executing adjustment of the parallax such that the stereoscopic image including both types of images has suitable parallax. Parallax correction is performed for the image captured by the first imaging unit 111 or the image captured by the second imaging unit 121 based on the vectors. Typically, the parallax correction can be realized by translating the image. In addition, as necessary, the parallax correction may be executed as a process accompanied by the magnification/reduction process.

In the example of FIG. 18, the parallax correction is performed by setting the translating vectors only for the first image (1f) of FIG. 18.

For the images (1f) and (2f) of FIG. 18, the parallax correction process is executed by applying the vectors in the image. The correction results become the images (1out) and (2out). Such images are output to the display device capable of executing 3D image display, so that the 3D image is displayed.

When the stereoscopic image is viewed, a viewer may have difficulty seeing or suffer from fatigue. In general, it is considered that such phenomenon may occur due to a difference of two images, a size difference, duplicated images, and the like. Out of the correction processes of FIG. 18, the following correction processes are particularly important in the stereoscopic image processing:

(a) optical zoom ratio correction;
(e) optical axis center coordinate correction; and
(f) parallax correction.

As the two-channel image processing, the stereoscopic image obtained by performing a correction process for matching one image with the other image or a correction process for approximating both types of images becomes a comfortable image that can be remarkably easily viewed.

Furthermore, (b) distortion aberration correction, (c) rotational hand-vibration correction, and (d) translating hand-vibration correction are necessary to form a more clear and stable image without vibration with high fidelity even using a monocular camera, and become the correction processes indispensable to display either 2D or 3D images.

5. Detailed Example of Process of Combining Correction Vectors

As described above with reference to FIG. 18, all of the correction processes in each correction unit can be executed through the coordinate transformation process by applying vectors.

That is, the following vectors are used in each correction process:

(a) a correction vector as the zoom ratio correction parameter applied to the zoom ratio correction process;

(b) a correction vector as the distortion aberration correction parameter applied to the distortion aberration correction process;

(c) a correction vector as the rotational hand-vibration correction parameter applied to the rotational hand-vibration correction process;

(d) a correction vector as the translating hand-vibration correction parameter applied to the translating hand-vibration correction process;

(e) a correction vector as the optical axis center correction parameter applied to the optical axis center correction process; and (f) a correction vector as the parallax correction parameter applied to the parallax correction process.

In the device configuration of FIGS. 1A and 1B, or 2A and 2B, the following individual vectors are computed as the correction parameter in each correction unit, and the coordinate transformation is executed using the correction vector in each correction unit.

In comparison, in the device configuration of FIGS. 3A and 3B, the control unit 172 combines the correction vectors applied to each of the correction processes (a) to (f) to compute a single combined correction vector, and the image transformation correction unit 251 executes processes by applying the combined correction vector.

Through such process, a series of correction processes described above with reference to FIG. 18 can be executed in a single correction process.

The process of computing the single combined correction vector by combining the correction vectors applied to each of the aforementioned correction processes (a) to (f) may be executed as a vector addition process. An example of the vector addition will be described with reference to FIG. 19.

Figure 19:
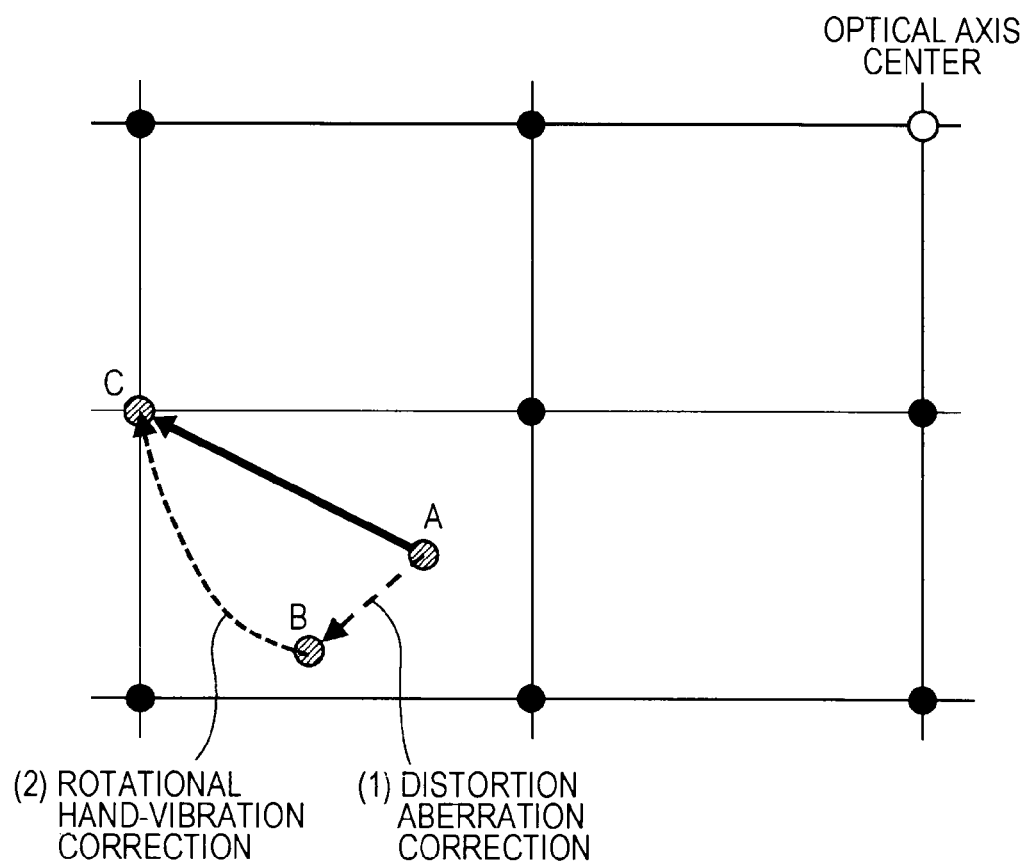
FIG. 19 is a diagram illustrating an exemplary addition processing example of the correction vector.

FIG. 19 illustrates a vector addition process applied to two different correction processes as an example of the vector addition. The two correction processes are:

(1) distortion aberration correction; and
(2) rotational hand-vibration correction.

In a case where the correction vectors are combined, a virtual correction process sequence is reversed to obtain the setting value. For example, it is assumed that the point C shown in FIG. 19 is located in the intersection in the grid where the correction parameters are to be stored.

The process of computing the combined correction vector may be executed, for example, by obtaining the corresponding point of the input image before the correction assuming that the point C is set to the point obtained after the distortion aberration correction and the rotational hand-vibration correction. Here, the coordinate of the point B is transformed to the point C according to (2) rotational hand-vibration correction. In addition, the coordinate of the point B is transformed to the point A according to (1) distortion aberration correction.

That is, by combining the vector correction vectors applied to two different correction processes, including (1) distortion aberration correction and (2) rotational hand-vibration correction, the coordinate of the point C corresponds to the point A in the input image. In this case, since the rotational hand-vibration correction vector for the point B is different from the rotational hand-vibration correction vector for the point A, it is important to obtain the vector in each stage by reversing the processing sequence.

The vector as the correction parameter set to the point C becomes the vector directing from the point A to the point C. As such, combining the correction vectors is not a simple vector sum, but may be achieved by obtaining the original coordinate in the input image by reversing the sequence of each correction process.

FIG. 19 illustrates an example of combining two correction vectors, including (1) distortion aberration correction and (2) rotational hand-vibration correction. Similarly, in a case where the correction vectors for the zoom ratio correction, the translating hand-vibration correction, the optical axis center correction, and the parallax correction are combined, the combined vector can also be computed by reversing the sequence of each correction process to return to original coordinate before the correction. The combined vector may be computed for all of the intersections in the grid.

Similar to FIGS. 3A and 3B, if the image transformation correction unit 251 capable of combining a plurality of types of correction processes is provided, the control unit obtains the combined correction vector to be set for each representative point by returning to the original coordinate in a reversed sequence from the images (1f) and (2f) to the images (1a) and (2a) of FIG. 18 considering the sequence of the coordinate transformation in each correction process.

In addition, in the process for computing the combined correction vector based on a plurality of correction vectors in the control unit, the computation efficiency can be improved by dividing, the correction vectors to be combined, into horizontal and vertical vectors and then combining them.

However, in a case where the vector combining process is executed based on such divided vectors, for example, it is necessary to take notice as follows. FIGS. 20A to 20C illustrate a configuration example in which the correction processes are processed by dividing into horizontal and vertical sequences.

It is assumed that the grid is set as shown in FIG. 20A, and the correction vector is set for the points A and C. Consideration will be made for the 2 Z-vectors for transforming coordinates from the points B and D to the points A and C, respectively. In a case of typical vector dividing, as shown in FIG. 20B, the point A can be divided into the horizontal vector VHA' and the vertical vector VVA, and the point C can be divided into the horizontal vector VHC' and the vertical vector VVC.

However, as described above with reference to FIG. 19, the vector to be set for the grid point A is the original coordinate to be moved to the point A, that is, a relative position at the point B. Through interpolation using the vectors VHA' and VHC' in FIG. 20B, the original coordinate of the point A becomes the point B', which is not a suitable coordinate transformation. Therefore, FIG. 20B is not used.

In this case, as shown in FIG. 20C, it is necessary to obtain the horizontal correction vector considering the vertical correction process. If the horizontal vectors VHA and VHC are set so as to pass through the point B at the time of interpolation in the vertical direction, the coordinate of the point B is appropriately transformed into the point A.

As such, in a case where the control unit performs processing by dividing the correction vectors into the horizontal and vertical vectors, the combined correction vector is processed by sequentially executing the process for obtaining original coordinates before the transformation in each stage.

A series of processes described herein may be executed by hardware, software, or a combination thereof. When the process is executed using software, a program recording the processing sequence may be installed and executed in a memory in a computer integrated into dedicated hardware, or a program may be installed and executed in a general-purpose computer that can execute various processes. For example, the program may be stored in a recording medium in advance. In addition to installation from the recording medium to the computer, the program may be received via networks such as the Internet and a local area network (LAN) and installed in a recording medium such as a hard disk inside.

Various processes described herein may be sequentially executed along the description, or may be individually or in parallel executed depending on necessity or a processing capacity of the device which executes processing. In addition, a system as used herein is a logical aggregate configuration including a plurality of devices, and each device is not necessarily housed in the same casing.

The present disclosure contains subject matter related to that disclosed in Japanese Priority Patent Application JP 2010-248838 filed in the Japan Patent Office on Nov. 5, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising: a plurality of imaging units; a correction unit that executes a correction process for images captured by a plurality of the imaging units; and a control unit that computes a correction parameter applied to a correction process in the correction unit, wherein the correction unit executes distortion aberration correction and hand-vibration correction for each of the captured images and an image characteristic matching correction process for matching characteristics between a plurality of images captured by a plurality of the imaging units; and wherein the control unit computes a combined correction vector obtained by combining correction vectors applied to each of a distortion aberration correction process, a rotational hand-vibration correction process, a translating hand-vibration correction process, a zoom ratio correction process, an optical axis center correction process, and a parallax correction process, and provides the combined correction vector to the correction unit, and the correction unit collectively executes the distortion aberration correction process, the rotational hand-vibration correction process, the translating hand-vibration correction process, the zoom ratio correction process, the optical axis center correction process, and the parallax correction process through an image transformation process by applying the combined correction vector.

2. The imaging apparatus according to claim 1, wherein the correction unit executes a zoom ratio correction process for matching zoom ratios of a plurality of images captured by a plurality of the imaging units as the image characteristic matching correction process.

3. The imaging apparatus according to claim 1, wherein the correction unit executes an optical axis center correction process for matching optical axis centers of a plurality of images captured by a plurality of the imaging units as the image characteristic matching correction process.

4. The imaging apparatus according to claim 1, wherein the correction unit further executes a parallax correction process for adjusting parallax of a plurality of images captured by a plurality of the imaging units.

5. The imaging apparatus according to claim 1, wherein the control unit computes a correction parameter applied to the correction process in the correction unit and provides the correction parameter to the correction unit.

6. The imaging apparatus according to claim 5, wherein the correction parameter is a correction vector applied to coordinate transformation of an image in a correction unit.

7. The imaging apparatus according to claim 1, wherein the correction unit includes:
  a distortion aberration correction unit that executes distortion aberration correction for each of the captured images;
  a rotational hand-vibration correction unit that executes rotational hand-vibration correction for each of the captured images;
  a translating hand-vibration correction unit that executes translating hand-vibration correction for each of the captured images;
  a zoom ratio correction unit that matches zoom ratios as characteristics of a plurality of images captured by a plurality of the imaging units;
  an optical axis center correction unit that matches optical axis centers as characteristics of a plurality of images captured by a plurality of the imaging units; and
  a parallax correction unit that executes a parallax correction process for adjusting parallax of a plurality of images captured by a plurality of the imaging units.

8. The imaging apparatus according to claim 1, wherein the control unit computes a combined correction vector obtained by combining correction vectors applied to a plurality of different correction processes executed by the correction unit and provides the combined correction vector to the correction unit, and
  wherein the correction unit collectively executes a plurality of the different correction processes through an image transformation process by applying the combined correction vector.

9. The imaging apparatus according to claim 1, wherein the imaging apparatus has a distortion aberration data storage unit that stores distortion aberration data corresponding to the imaging unit applied to distortion aberration correction, and
  the control unit creates a distortion aberration correction parameter based on the data obtained from the distortion aberration data storage unit.

10. The imaging apparatus according to claim 1, wherein the imaging apparatus has an optical axis center correction value storage unit that stores optical axis center correction data applied to optical axis center correction for matching optical axis centers as characteristics of a plurality of images captured by a plurality of imaging units, and
  the control unit generates an optical axis center correction parameter based on the data obtained from the optical axis center correction value storage unit.

11. The imaging apparatus according to claim 1, wherein the imaging apparatus has a zoom ratio correction value storage unit that stores zoom ratio correction data applied to zoom ratio correction for matching zoom ratios as characteristics of a plurality of images captured by a plurality of imaging units, and
  the control unit generates a zoom ratio correction parameter based on data obtained from the zoom ratio correction value storage unit.

12. The imaging apparatus according to claim 1, wherein the imaging apparatus has a parallax data storage unit that stores parallax data applied to parallax correction for adjusting parallax of a plurality of images captured by a plurality of imaging units, and
  the control unit generates a parallax correction parameter based on the data obtained from the parallax data storage unit.

13. An image processing apparatus comprising: a correction unit that executes a correction process for images captured by a plurality of imaging units; and a control unit that computes a correction parameter applied to a correction process in the correction unit, wherein the correction unit executes distortion aberration correction and hand-vibration correction for each captured image and executes an image characteristic matching correction process for matching characteristics of a plurality of images captured by a plurality of imaging units; and wherein the control unit computes a combined correction vector obtained by combining correction vectors applied to each of a distortion aberration correction process, a rotational hand-vibration correction process, a translating hand-vibration correction process, a zoom ratio correction process, an optical axis center correction process, and a parallax correction process, and provides the combined correction vector to the correction unit, and the correction unit collectively executes the distortion aberration correction process, the rotational hand-vibration correction process, the translating hand-vibration correction process, the zoom ratio correction process, the optical axis center correction process, and the parallax correction process through an image transformation process by applying the combined correction vector.

14. An image processing method executed in an image processing apparatus, the method comprising: computing a correction parameter applied to a correction process in a correction unit; and executing the correction process for images captured by a plurality of imaging units by applying the correction parameter, wherein the executing of the correction process includes executing distortion aberration correction and hand-vibration correction for each of the captured images, and executing an image characteristic matching correction process for matching characteristics of a plurality of images captured by a plurality of the imaging units; and wherein the control unit computing a combined correction vector obtained by combining correction vectors applied to each of a distortion aberration correction process, a rotational hand-vibration correction process, a translating hand-vibration correction process, a zoom ratio correction process, an optical axis center correction process, and a parallax correction process, and providing the combined correction vector to the correction unit, and the correction unit collectively executing the distortion aberration correction process, the rotational hand-vibration correction process, the translating hand-vibration correction process, the zoom ratio correction process, the optical axis center correction process, and the parallax correction process through an image transformation process by applying the combined correction vector.

15. A non-transitory computer-readable medium having store thereon a program for executing image processing in an image processing apparatus, comprising: computing a correction parameter applied to a correction process in a correction unit; and executing the correction process for images captured by a plurality of imaging units by applying the correction parameter, wherein the executing of the correction process includes executing distortion aberration correction and hand-vibration correction for each of the captured images, and executing an image characteristic matching correction process for matching characteristics of a plurality of images captured by a plurality of the imaging units; and wherein the control unit computes a combined correction vector obtained by combining correction vectors applied to each of a distortion aberration correction process, a rotational hand-vibration correction process, a translating hand-vibration correction process, a zoom ratio correction process, an optical axis center correction process, and a parallax correction process, and provides the combined correction vector to the correction unit, and the correction unit collectively executes the distortion aberration correction process, the rotational hand-vibration correction process, the translating hand-vibration correction process, the zoom ratio correction process, the optical axis center correction process, and the parallax correction process through an image transformation process by applying the combined correction vector.

\* \* \* \* \*